United States Patent
Nomura et al.

(10) Patent No.: US 7,346,650 B2
(45) Date of Patent: Mar. 18, 2008

(54) RECORDING AND REPRODUCING SYSTEM, SERVER APPARATUS, RECORDING AND REPRODUCING METHOD, TERMINAL APPARATUS, OPERATING METHOD, AND PROGRAM STORAGE MEDIUM

(75) Inventors: Yasuo Nomura, Kanagawa (JP); Yoshikazu Watanabe, Kanagawa (JP); Yasuhiko Terashita, Kanagawa (JP); Nobuaki Yamaguchi, Kanagawa (JP); Yasuhito Shikata, Tokyo (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 09/947,020

(22) Filed: Sep. 5, 2001

(65) Prior Publication Data

US 2002/0046241 A1    Apr. 18, 2002

(30) Foreign Application Priority Data

Sep. 7, 2000    (JP)    ............................. 2000-276642

(51) Int. Cl.
 *G06F 15/16*    (2006.01)
(52) U.S. Cl. ...................... 709/203; 709/201; 709/202; 709/217; 709/219
(58) Field of Classification Search ................ 709/203; 725/55, 86
 See application file for complete search history.

(56) References Cited

U.S. PATENT DOCUMENTS 5,671,225 A * 9/1997 Hooper et al. ............... 370/468
6,119,154 A * 9/2000 Weaver et al. ............... 709/219
6,269,394 B1 * 7/2001 Kenner et al. ............... 709/217
6,314,575 B1 * 11/2001 Billock et al. ................. 725/87
6,510,556 B1 * 1/2003 Kusaba et al. ................. 725/93
6,549,929 B1 * 4/2003 Sullivan ...................... 718/102
6,732,158 B1 * 5/2004 Hesselink et al. ........... 709/208
6,769,127 B1 * 7/2004 Bonomi et al. ............... 725/39
6,804,825 B1 * 10/2004 White et al. .................. 725/87

FOREIGN PATENT DOCUMENTS

WO    WO 00 31912    6/2000
WO    WO 00 59230    10/2000

* cited by examiner

*Primary Examiner*—Jason Cardone
*Assistant Examiner*—Nicholas R Taylor
(74) *Attorney, Agent, or Firm*—Frommer Lawrence & Haug LLP; William S. Frommer; Thomas F. Presson

(57) ABSTRACT

A recording and reproducing system according to the invention is made up of a server apparatus and its terminals connected over a local area network that is administered independently in a limited area. In the system, any one of the terminals may generate a reproduction request and send it to the server apparatus over the LAN. In response to the request, the server apparatus reproduces video data from a storage medium installed therein and sends the reproduced video data to the requesting terminal over the LAN. In this manner, a user may reproduce video data and enjoy images thereof by remotely operating the server apparatus with ease from any terminal configured in the system.

59 Claims, 21 Drawing Sheets

FIG. 9

New Preset: Confirm what has been preset

Please confirm the following settings that have been made for
unattended recording

```
Start Time:        16:30, Sept. 16, 2000
End Time:          18:30, Sept. 16, 2000
Channel:           Fumi-TV on channel 5
Recording Mode:    Standard
Recording Style:   Once
Expiration Date:   None
Program Name:      News world
Cabinet:           Temporary storage
Memo:
```

Cancel    Back    OK    Help

FIG.10

| Broadcast Program Guide | | | | | | | |
|---|---|---|---|---|---|---|---|
| | | 1ch<br>NHN General TV | | 2ch<br>Culture TV | 3ch<br>Honjitsu-TV | | 5ch<br>Fumi-TV |
| 19:00 | 0 | 7 0'clock news<br>▽Today's topics<br>▽Sports<br>▽Stocks and exchange rates<br>▽Weather information<br>Anchor person | R | 0 After-school club Welcome newcomers R | 0 Professional Baseball Game<br>"Kyodai vs. Tanaka,"<br>at Tokyo Stadium<br>Commentator:<br>OKAI Toshu<br>Sportscaster:<br>KAMIHOSHI ICHIRO | 0 | Sunshine on TV, "Hospital" R |
| | 57 | Map | | 30 Sign language R<br>45 Your health R | | | |
| 20:00 | 0 | Drama "Nandara-Kandara" | R | 0 Together with you R | | | |
| | 45 | Local weather forecasts | | 30 Teach yourself braille R | | | |

Back

| INDEX INFORMATION | STILL PICTURE DATA |
| --- | --- |
| | SWITCHING POSITION DATA |
| PRESET PROGRAM INFORMATION | PROGRAM NAME |
| | DATE AND TIME OF RECORDING |
| | RECORDING TIME PERIOD |
| | CHANNEL |
| | RECORDING MODE |
| | COMMENT |
| | DATE AND TIME OF SUPPLEMENTARY INFORMATION/DATA CREATION |
| UPDATE INFORMATION | DATE AND TIME OF PRECEDING REPRODUCTION |
| | END POSITION OF PRECEDING REPRODUCTION |

RECORDING AND REPRODUCING SYSTEM, SERVER APPARATUS, RECORDING AND REPRODUCING METHOD, TERMINAL APPARATUS, OPERATING METHOD, AND PROGRAM STORAGE MEDIUM

BACKGROUND OF THE INVENTION

The present invention relates to a recording and reproducing system, a server apparatus, a terminal apparatus, a recording and reproducing method, an operating method, and a program storage medium. More particularly, the invention relates to a home network system built on a local area network (LAN) established in the household.

Recent years have seen the widespread acceptance of video tape recorders along with TV sets by a majority of households. On many occasions, desired TV programs are recorded on the video tape recorder so that they may be reproduced for later viewing at a convenient time.

In the household, the video tape recorder is generally set up together with the TV set in one room such as the living room.

In that setup, it is necessary always to go into the room where the video tape recorder is installed along with the TV set in order to reproduce and view TV programs that were recorded on the video tape recorder. For users, the need always to reach the room for video-related operations can prove inconvenient.

SUMMARY OF THE INVENTION

The present invention has been made in view of the above circumstances and provides a recording and reproducing system, a server apparatus, a terminal apparatus, a recording and reproducing method, an operating method, and a program storage medium each offering excellent usability.

According to first aspect of the present invention there is provided a recording and reproducing system constituted by a server apparatus and terminal apparatuses connected over a local area network;

wherein each of said terminal apparatuses comprises:

operation request generating means for generating a reproduction request bound for said server apparatus; and terminal-side communicating means for communicating with said server apparatus over said local area network; and wherein said server apparatus comprises:

server-side communicating means for communicating with each of said terminal apparatuses over said local area network;

server-side recording/reproducing means for recording and reproducing video data to and from a predetermined server-side storage medium; and server-side controlling means which, in response to said reproduction request sent from any one of said terminal apparatuses over said local area network, causes said server-side recording/reproducing means to reproduce said video data from said server-side storage medium and transmits the reproduced video data through said server-side communicating means to the requesting terminal apparatus over said local area network.

According to second aspect of the present invention there is provided a server apparatus connected to terminal apparatuses on a local area network that is administered independently in a limited area, said server apparatus comprising:

communicating means for communicating with each of said terminal apparatuses over said local area network;

recording/reproducing means for recording and reproducing video data to and from a predetermined storage medium; and controlling means which, in response to a reproduction request sent from any one of said terminal apparatuses over said local area network, causes said recording/reproducing means to reproduce said video data from said storage medium and transmits the reproduced video data through said communicating means to the requesting terminal apparatus over said local area network.

According to third aspect of the present invention there is provided a terminal apparatus connected to a server apparatus over a local area network, comprising:

operation request generating means for generating a reproduction request for soliciting the reproduction of recorded video data by said server apparatus capable of recording and reproducing video data; and communicating means for communicating with said server apparatus over said local area network;

wherein said communicating means transmits said reproduction request generated by said operation request generating means to said server apparatus over said local area network, and receives the video data reproduced by said server apparatus in response to said reproduction request and transmitted from said server apparatus.

According to fourth aspect of the present invention there is provided a recording and reproducing method for use with a server apparatus connected to terminal apparatuses on a local area network that is administered independently in a limited area, the method comprising the steps of:

receiving a reproduction request sent from any one of said terminal apparatuses over said local area network; and reproducing video data from a predetermined storage medium in response to said reproduction request before transmitting the reproduced video data to the requesting terminal apparatus over said local area network.

According to fifth aspect of the present invention there is provided an operating method for use with a terminal apparatus connected to a server apparatus over a local area network, the method comprising the steps of:

generating a reproduction request for soliciting the reproduction of recorded video data by said server apparatus capable of recording and reproducing video data; and receiving the video data reproduced and transmitted by said server apparatus in response to said reproduction request transmitted to said server apparatus over said local area network.

According to sixth aspect of the present invention there is provided a program storage medium which stores a program for use with a server apparatus connected to terminal apparatuses on a local area network that is administered independently in a limited area, said program causing said server apparatus to execute the steps of:

receiving a reproduction request sent from any one of said terminal apparatuses over said local area network; and reproducing video data from a predetermined storage medium in response to said reproduction request before transmitting the reproduced video data to the requesting terminal apparatus over said local area network.

According to seventh aspect of the present invention there is provided a program storage medium which stores a program for use with a terminal apparatus connected to a server apparatus over a local area network, said program causing said terminal apparatus to execute the steps of:

generating a reproduction request for soliciting the reproduction of recorded video data by said server apparatus capable of recording and reproducing video data; and receiving the video data reproduced and transmitted by said server apparatus in response to said reproduction request transmitted to said server apparatus over said local area network.

Other objects, features and advantages of the invention will become more apparent upon a reading of the following description and appended drawings.

BRIEF DESCRIPTION OF THE DRAWINGS

FIG. 9 is a schematic view portraying a typical structure of a third unattended recording preset screen;

FIG. 10 is a schematic view picturing a typical structure of a program list screen;

DESCRIPTION OF THE PREFERRED EMBODIMENTS

Figure 1:
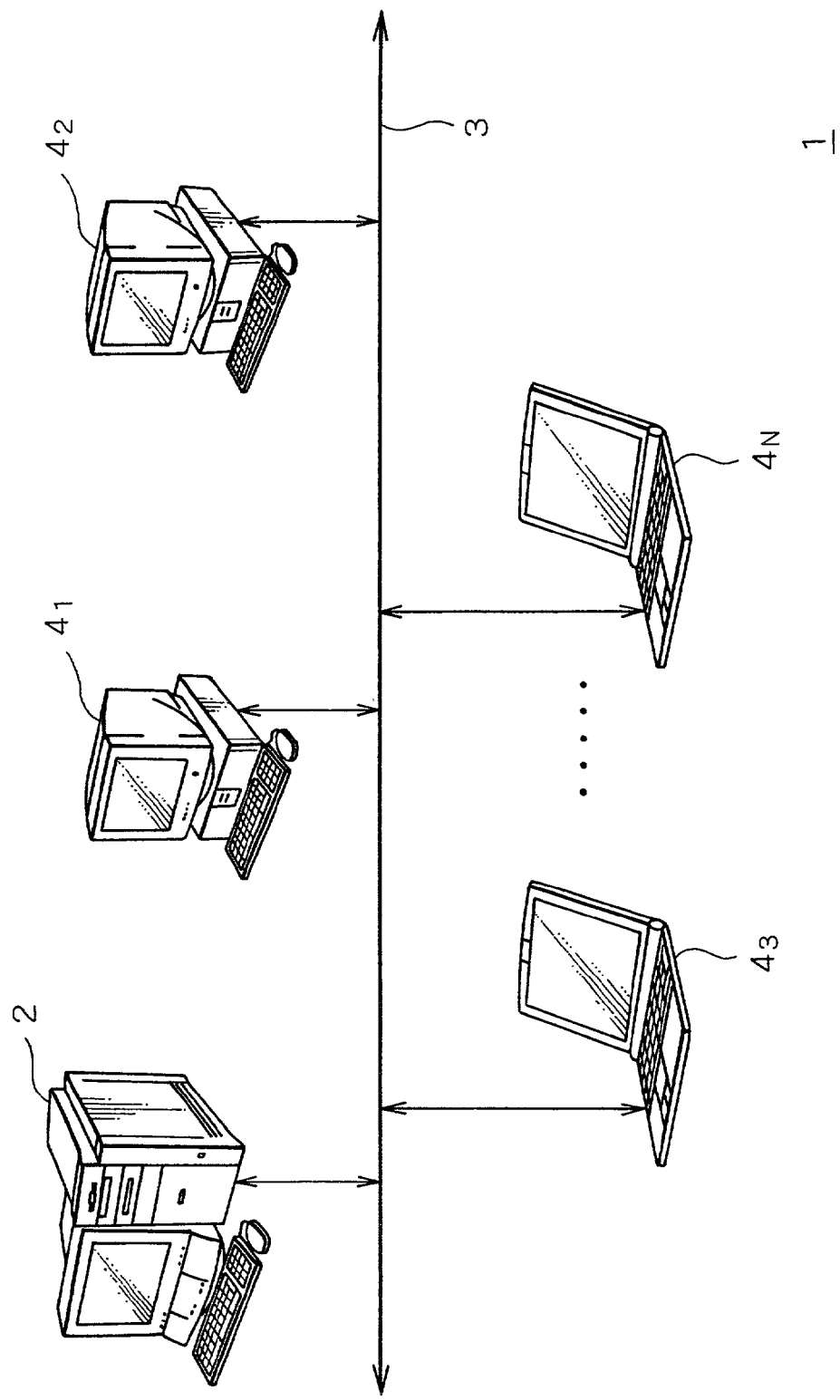
FIG. 1 is a schematic view of a typical home network system according to the invention.

Preferred embodiments of this invention will now be described by referring to the accompanying drawings. In FIG. 1, reference numeral 1 denotes a home network system according to the invention. In the system 1, a server apparatus 2 made of a personal computer is connected to a plurality of laptop or desktop personal computers $4_1$ through $4_N$ on a local area network (LAN) 3.

In the setup above, The server apparatus 2 is arranged to acquire TV broadcast from the outside. The apparatus 2 is capable of receiving a plurality of TV programs, of recording designated TV programs selectively out of those received, and of reproducing any of the recorded TV programs on a display unit and through speakers in accordance with a reproduction instruction entered from a keyboard or a mouse.

Based on reproduction requests from any of the personal computers $4_1$ through $4_N$, the server apparatus 2 transmits recorded TV programs to the requesting personal computer. In turn, the personal computer in question (any one of $4_1$ through $4_N$) reproduces with its display units and speakers what has been received from the server.

Figure 2:
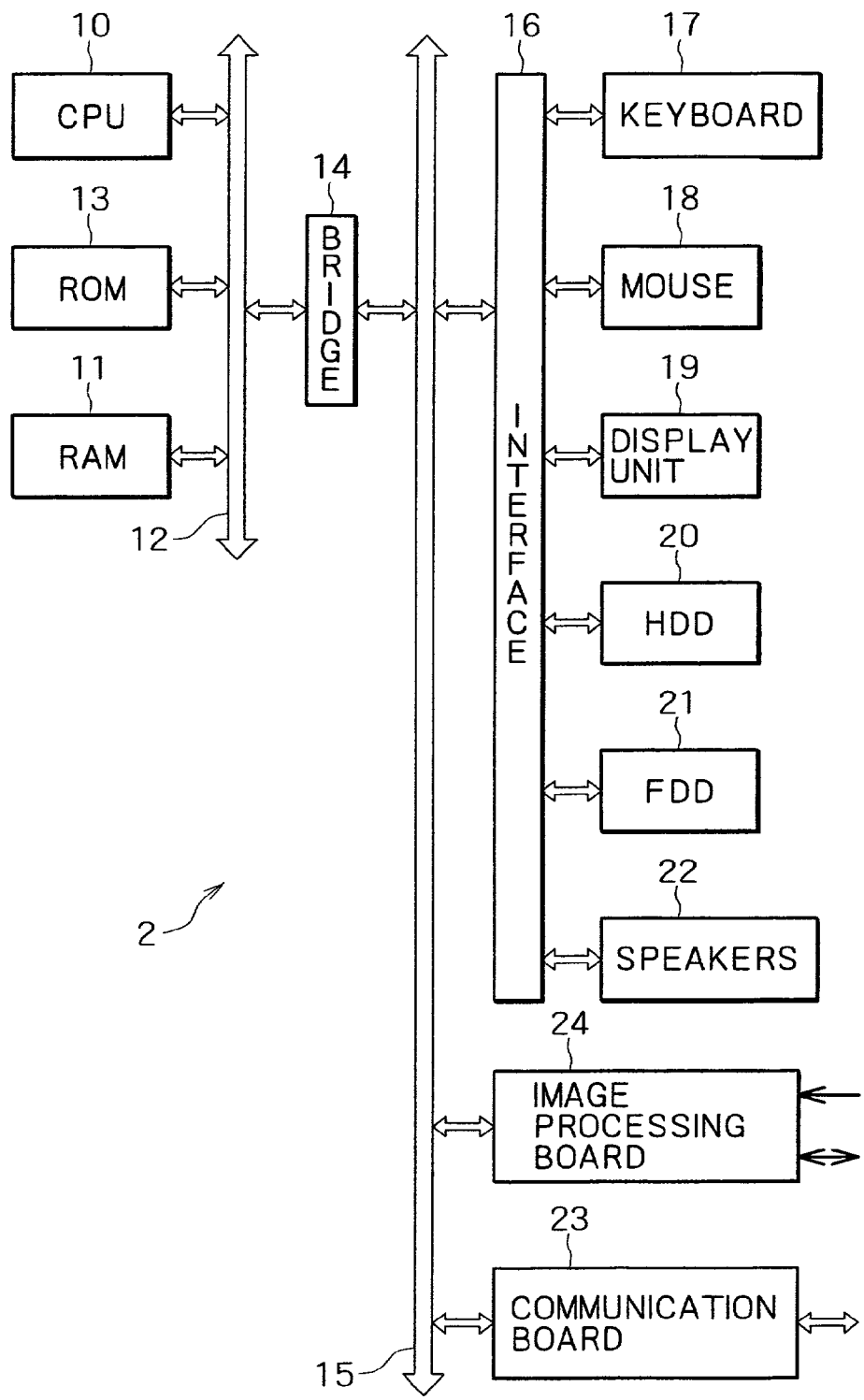
FIG. 2 is a block diagram showing a typical circuit structure of a server apparatus.

In the server apparatus 2, as shown in FIG. 2, a CPU (central processing unit) 10 for overall control of diverse server functions is connected along with a RAM (random access memory) 11 to a host bus 12 composed of a CPU bus or a memory bus. Necessary functions are implemented by the CPU 10 executing various programs and application software loaded in the RAM 11, at a predetermined operating speed based on a system clock signal given by a clock generator (not shown).

The host bus 12 is connected to a ROM (read only memory) 13 that contains in advance diverse programs, applications, and basically fixed data for use in various parameters to be operated on.

The host bus 12 is also connected via a bridge 14 to an external bus 15 such as a PCI (Peripheral Component Interconnect) bus. The external bus 15 is connected via an interface 16 to a keyboard 17, a mouse 18, a display unit 19, a hard disc drive (HDD) 20, a floppy disc drive (FDD) 21, and speakers 22.

The hard disc of the HDD 20 stores an OS (operating system), a WWW (World Wide Web) browser, an unattended recording presetting program, a preset monitoring program, a managing/searching program, an editing program, a recording/reproducing program, and other types of application software. These programs are transferred as needed to the RAM 11 during boot-up.

In operation, the CPU 10 starts programs and applications loaded into the RAM 11 from the hard disc of the HDD 20 or from the ROM 13. With the relevant programs and applications activated, the CPU 10 records and reproduces TV programs and carries out other processes in accordance with operation instructions entered from the keyboard 17 and mouse 18. Results of the execution by the CPU 10 are sent as image data such as text or video data such as TV programs to the display unit 19. Given the data, the display unit 19 displays the text and TV program images accordingly.

Furthermore, the CPU 10 feeds the speakers 22 with audio data generated as needed during process execution or with audio data accompanying the reproduced TV program. The audio data are output acoustically by the speakers 22 as sound illustratively indicating the acquisition of an operation instruction or the occurrence of an error, or as voice of the TV program being reproduced.

If the addition of optional functions is desired, the CPU 10 is arranged to read optional function programs from a floppy disc inserted in the FDD 21 and transfers the retrieved programs to the HDD 20 or RAM 11. When data derived from specific processes are to be taken out to the outside, the data in question may be sent to the FDD 21 for storage onto a floppy disc therein.

The external bus 15 is connected to a communication board 23 having a modem and a modem terminal. Using the communication board 23 and based on the WWW browser active in the RAM 11, the CPU 10 connects to an Internet service provider (not shown) via a public switched network and the Internet to communicate with the ISP.

The external bus 15 is also connected to an image processing board 24. The image processing board 24 has two kinds of cables connected: one for receiving TV broadcast, and the other for establishing the LAN 3.

Figure 3:
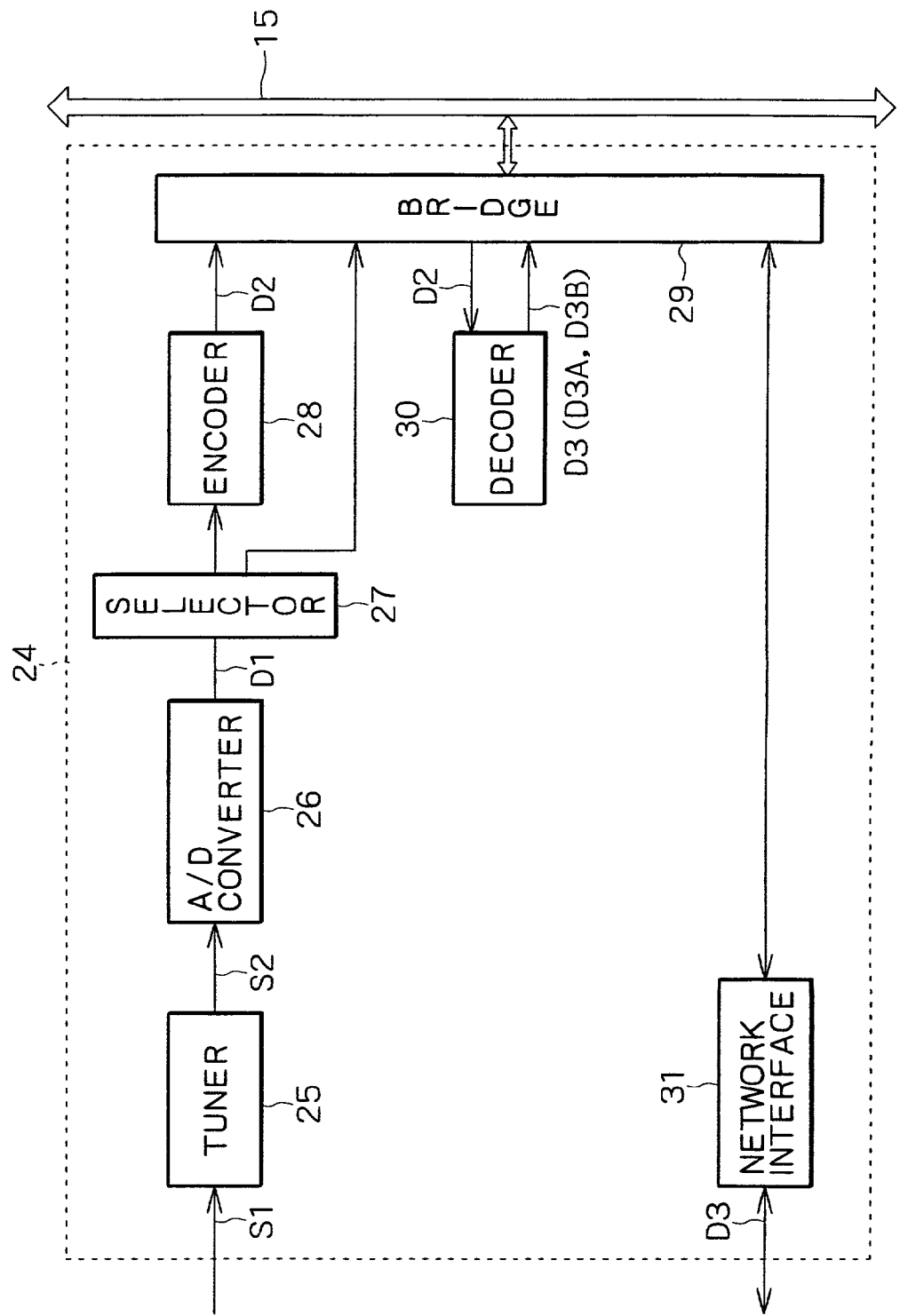
FIG. 3 is a block diagram depicting a typical circuit structure of an image processing board in the server apparatus.

As shown in FIG. 3, the image processing board 24 works under control of the CPU 10. In operation, the image processing board 24 first takes externally supplied TV broadcast signals S1 into a tuner 25. The tuner 25 selects a designated TV program from those on a plurality of channels represented by the received TV signals. An analog video/audio signal S2 of the selected TV program from the tuner 25 is converted by an analog/digital converter 26 into digital video/audio data D1 before being sent to a selector 27.

The selector 27 forwards the video/audio data D1 from the analog/digital converter 26 to an encoder 28 if the TV program is to be recorded.

If the TV program is to be viewed in real time as usual on the TV set, the selector 27 allows the video/audio data D1 from the analog/digital converter 26 to go straight onto the external bus 15 past the bridge 29. Video data D1A as part of the video/audio data D1 are sent to the display unit 19, while audio data D1B making up another part of the video/audio data D1 are fed to the speakers 22. The TV program is then viewed and listened to through the display unit 19 and speakers 22.

If the TV program is to be viewed in real time and to be recorded simultaneously, the selector 27 forwards the video/audio data D1 from the analog/digital converter 26 to both the encoder 28 and the bridge 29.

The encoder 28 converts the video/audio data D1 from the selector 27 into a predetermined compression coding format such as that of MPEG (Moving Picture Experts Group). Compression-coded data D2 are output onto the external bus 15 via the bridge 29 for recording to the hard disc of the HDD 20. This is how TV programs are recorded.

Given a reproduction instruction from the CPU 10, the image processing board 24 places into a decoder 30 the compression-coded data D2 retrieved from the hard disc of the HDD 20 via the external bus 15 and bridge 29. The decoder 30 decompresses the compression-coded data D2 using a decompression decoding procedure corresponding to the compression coding format in use. Of video/audio data D3 thus obtained from the decoding process, video data D3A are sent to the display unit 19 via the bridge 29 and external bus 15 while audio data D3B are fed to the speakers 22 through the bridge 29 and external bus 15.

In the manner described, the image processing board 24 allows recorded TV programs to be viewed and listened to as desired by means of the display unit 19 and speakers 22.

In addition, the image processing board 24 admits through a network interface 31 reproduction requests coming from the personal computers $4_1$ through $4_N$. The received requests are sent successively from the network interface 31 through the bridge 29 and external bus 15 to the CPU 10.

As described, when the compression-coded data D2 or the like of the TV program reproduced from the hard disc of the HDD 20 are furnished over the external bus 15 in response to reproduction requests from the personal computers $4_1$ through $4_N$, the data D2 are admitted into the network interface 31 of the image processing board 24 via the bridge 29. From the network interface 31, the compression-coded data D2 or the like are sent to the personal computers $4_1$ through $4_N$.

The image processing board 24 thus allows users of the personal computers $4_1$ through $4_N$ to view the TV programs as desired.

Figure 4:
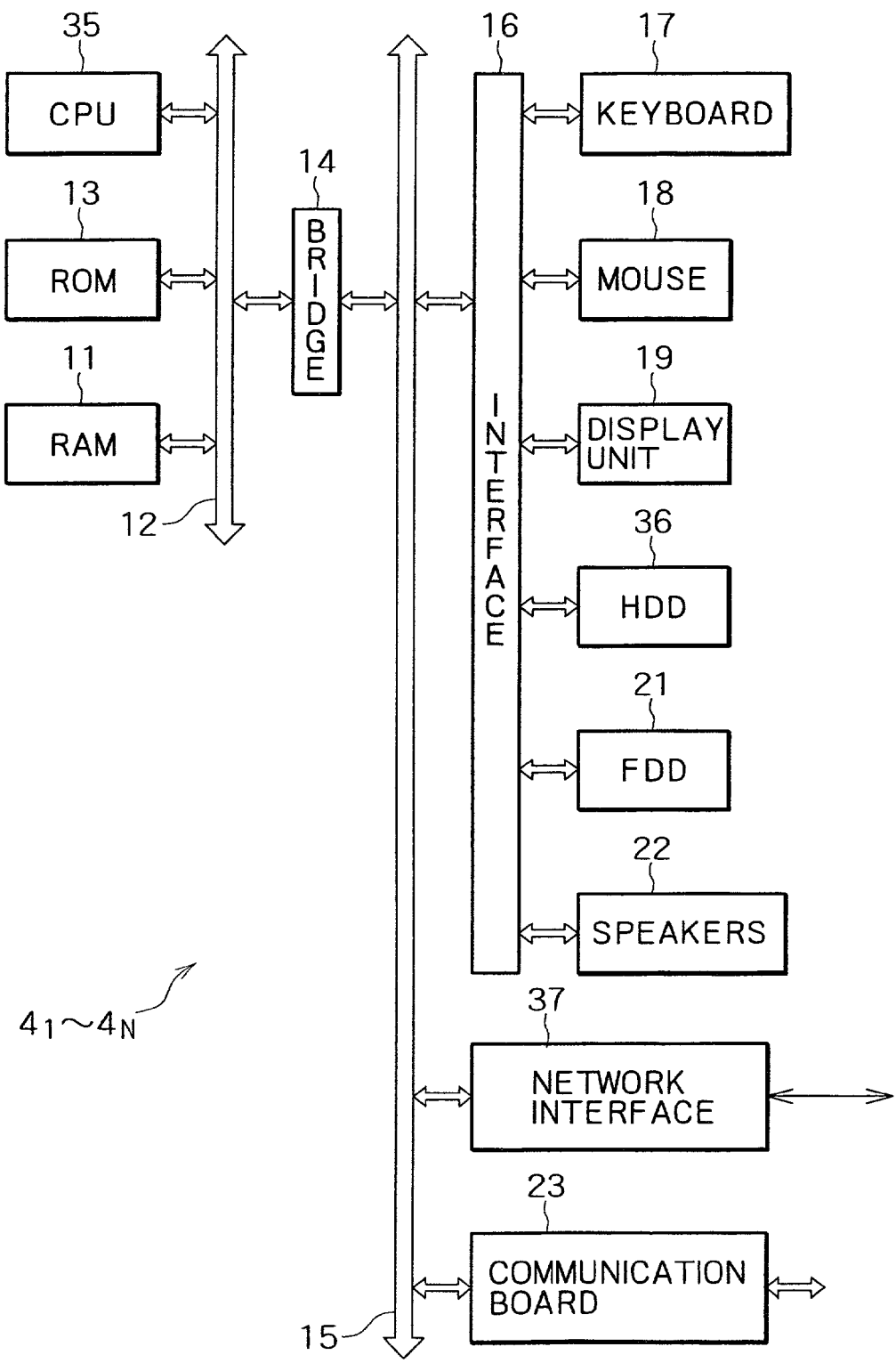
FIG. 4 is a block diagram sketching a typical circuit structure of a personal computer.

Of the reference numerals In FIG. 4, those already used in FIG. 3 designate like or corresponding parts. Referring to FIG. 4, each of the personal computers $4_1$ through $4_N$ has its CPU 35 connected along with the RAM 11 to the host bus 12. The CPU 35 provides overall control of diverse functions of the personal computer in question.

The hard disc of an HDD 36 connected to the external bus 15 contains an OS, a WWW browser, a preset information setting program, a recording/reproducing program, a server operation program, and other kinds of application software. These programs are transferred as needed to the RAM 11 during boot-up.

The CPU 35 implements various PC functions based on the programs and application software loaded into the RAM 11 from the hard disc of the HDD 36 or from the ROM 13.

The external bus 15 is further connected to a network interface 37 that accommodates a suitable cable for building up the LAN 3. With the network interfaces 37 in operation, the LAN 3 permits data exchanges between the server 2 on the one hand and the personal computers $4_1$ through $4_N$ on the other hand.

Figure 5:
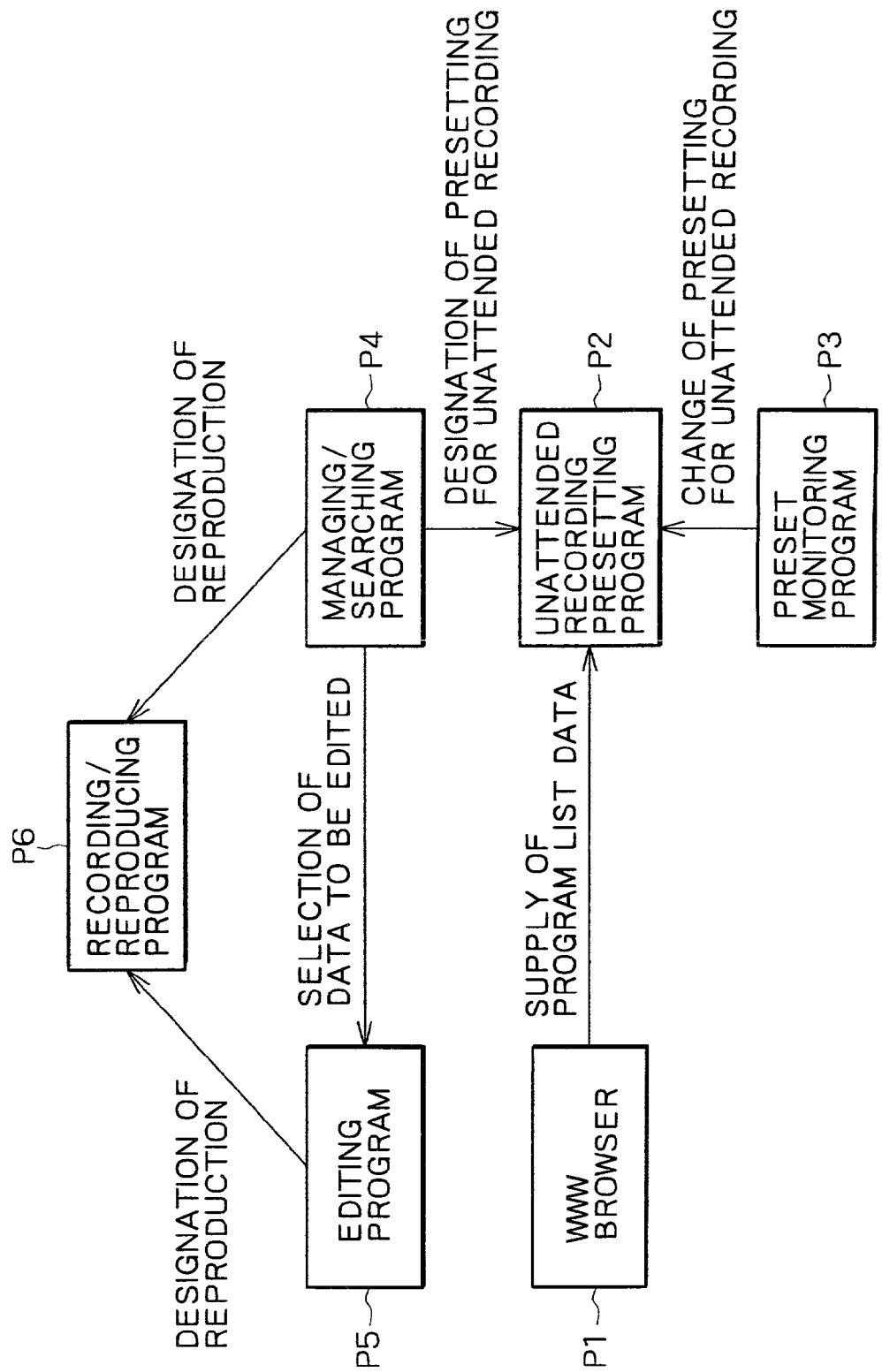
FIG. 5 is a schematic view explaining programs installed in the personal computer.

The WWW browser P1, unattended recording presetting program P2, preset monitoring program P3, managing/searching program P4, editing program P5, and recording/reproducing program P6 stored on the hard disc of the HDD 20 in the server apparatus 2 are related with one another as illustrated in FIG. 5.

The WWW browser P1 is a program that is used to acquire, from a suitable Internet service provider, program list data for creating unattended recording preset data.

Using an unattended recording preset screen (to be described later) or based on the program list data acquired by the WWW browser P1, the unattended recording presetting program P2 performs three things: creating data for presetting desired TV programs for unattended recording; managing the unattended recording preset data thus created on the hard disc of the HDD 20; and securing regions on the hard disc of the HDD 20 necessary for recording the target TV programs that were preset for unattended recording (i.e., compression-coded data D2).

The preset monitoring program P3 compares a recording start time and a recording end time of each TV program defined by the unattended recording preset data, with the current time data from an RTC (real time clock) circuit inside the server apparatus 2. Upon comparison, the preset monitoring program P3 checks to see whether the current time has reached any recording start time or end time.

The managing/searching program P4 is used to create a preset status list of TV programs preset for unattended recording, on the basis of the unattended recording preset data held on the hard disc of the HDD 20, and to manage TV programs recorded onto the HDD 20. In addition, the managing/searching program P4 creates and manages, on the hard disc, supplementary information/data made up of recording dates and times of TV programs and related program information based on the video/audio data D1 of each preset TV program recorded unattended along with the corresponding unattended recording preset data, and on the basis of the video/audio data D1 of each TV program recorded in real time together with the associated recording condition data. Furthermore, the managing/searching program P4 creates a recording status list of TV programs targeted for recording in accordance with the supplementary information/data.

The editing program P5 is used to edit in a desired manner one or a plurality of TV programs designated selectively in the recording status list created by the managing/searching program P4.

The recording/reproducing program P6 causes the image processing board 24 to perform the recording and reproducing processes described above with reference to FIG. 3. Furthermore, the recording/reproducing program P6 records and retrieves the unattended recording preset data, recording condition data, compression-coded data D2 of TV programs, and supplementary information/data to and from the hard disc of the HDD 20.

When a request is made for displaying a preset status list and a recording status list, the recording/reproducing program P6 reproduces the unattended recording preset data and supplementary information/data from the hard disc of the HDD 20. When a TV program reproduction instruction is issued or when a given TV program is designated for editing by the editing program P5, the recording/reproducing program P6 reproduces the compression-coded data D2 of the TV program in question from the hard disc of the HDD 20.

Following the unattended recording of a TV program under surveillance of the preset monitoring program P3, the unattended recording presetting program P2 creates supplementary information/data and erases the corresponding unattended recording preset data. If any unattended recording preset data is designated for erasure from the preset status list created by the managing/searching program P4, the unattended recording presetting program P2 erases the data in question.

In practice, when an instruction for displaying a TV program being currently broadcast is entered from the keyboard 17 or the mouse 18, the CPU 10 of the server apparatus 2 controls the image processing board 24 in keeping with the recording/reproducing program P6 active in the RAM 11 and causes a program display screen 39 to appear on the display unit 19.

The program display screen 39 comprises a program display area 40, a recording condition setting area 41, channel changing buttons 42, audio changing buttons 43, a recording button 44, a stop button 45, a play button 46, and a pause button 47.

With the above screen in use, the CPU 10 causes a TV program image to appear in the program display area 40 based on the video data D1A of the TV program selected by operation of the channel switching buttons 42. In the state above, clicking on the recording button 44 with the mouse 18 starts recording the compression-coded data D2 of the currently broadcast TV program onto the hard disc of the HDD 20, the data D2 being derived from the video/audio data D1 of the TV program in question.

When a TV program recording process is started, the CPU 10 displays within the recording condition setting area 41 the name and channel number of the TV program being recorded, recording start and end times defined relative to the current time obtained from the RTC circuit, a recording mode selected by operation of from the keyboard 17 or mouse 18, and a cabinet name representative of a directory in which to record the compression-coded data D2 of the TV program in question. Thereafter, clicking on the stop button 45 with the mouse 18 terminates the recording of the TV program and causes various kinds of information shown in the recording condition setting area 41 to be recorded onto the hard disc of the HDD 20 as recording condition data.

There are three recording modes to choose from: a high quality mode in which recorded data are subject to a high image quality compression coding procedure such as that of MPEG 2; a standard mode; and a video CD (Compact Disc) compatible mode in which recorded data are subject to a compression coding procedure such as that of MPEG1. One of the three modes is selected as desired.

Unless otherwise specified, the cabinet is given a predetermined name such as "Temporary storage." If directories have been prepared for different categories such as news, sports, dramas and movies covering TV programs to be preset for unattended recording, these category names may be selected as cabinets.

Figure 7:
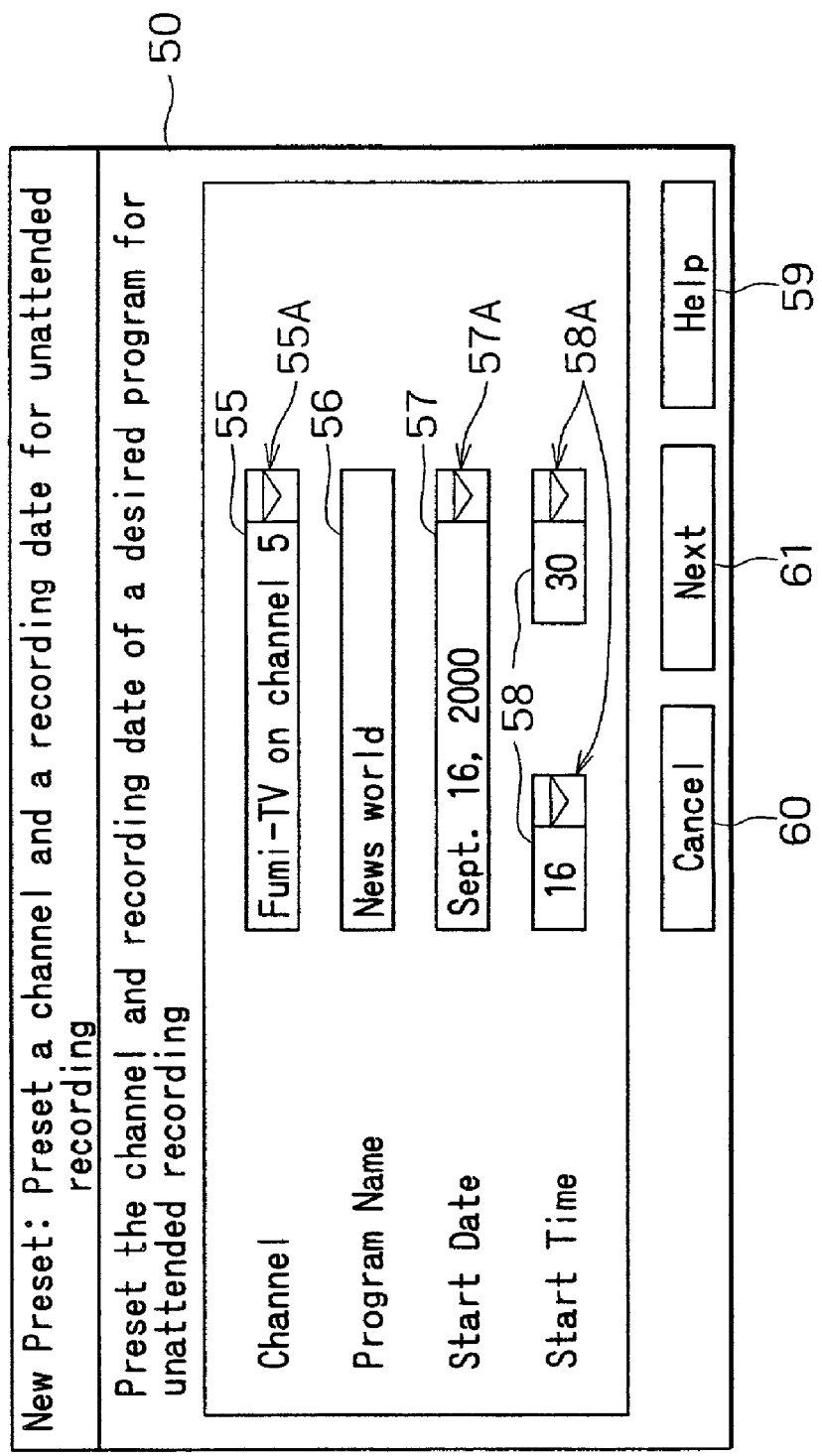
FIG. 7 is a schematic view illustrating a typical structure of a first unattended recording preset screen.
Figure 8:
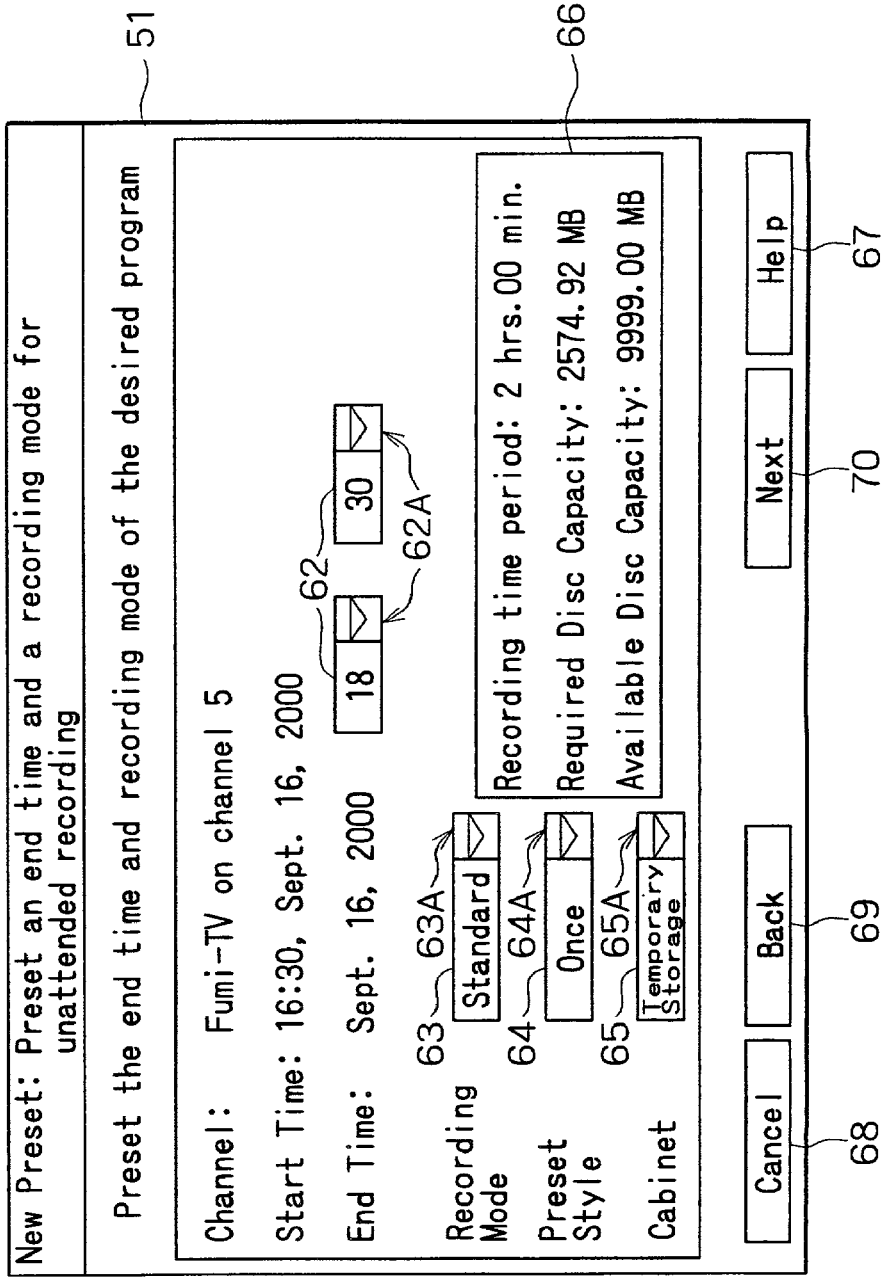
FIG. 8 is a schematic view presenting a typical structure of a second unattended recording preset screen.

When an instruction for presetting unattended recording is entered from the keyboard 17 or mouse 18, the CPU 10 causes a first unattended recording preset screen 50, i.e., one of the first through the third screens (50-52) in a three-page window structure, to appear on the display unit 19 in accordance with the unattended recording presetting program P2 active in the RAM 11, as depicted in FIGS. 7 through 9.

The first unattended recording preset screen 50 includes a channel setting field 55, a program name input field 56, a recording date setting field 57, and a recording start time setting field 58.

If preset information is input from the keyboard 17 into the channel setting field 55, program name input field 56, recording date setting field 57, and recording start time setting field 58 on the first unattended recording preset screen 50, or if the mouse 18 is used to click on selection buttons 55A, 57A and 58A to the right of the channel setting field 55, recording date setting field 57 and recording start time setting field 58 respectively, then the CPU 10 displays the following: the channel on which the preset TV program is to be broadcast, in the channel setting field 55; the name of the preset TV program in the program name input field 56; the date of recording in the recording date setting field 57; and the recording start time in minutes in the recording start time setting field 58.

The first unattended recording preset screen 50 also includes a help button 59, a cancel button 60 for canceling settings, and a next-page button 61 (typically indicated as "Next"). If the next-page button 61 is clicked on with the mouse 18, the CPU 10 replaces the first unattended recording preset screen 50 with the second unattended recording preset screen 51.

The second unattended recording preset screen 51 comprises a recording end time setting field 62, a recording mode setting field 63, a preset style setting field 64, a cabinet setting field 65, and a disc use status display area 66.

If preset information is input from the keyboard 17 into the recording end time setting field 62, recording mode setting field 63, preset style setting field 64, and cabinet setting field 65 on the second unattended recording preset screen 51, or if the mouse 18 is used to click on selection buttons 62A, 63A, 64A and 65A to the right of the recording end time setting field 62, recording mode setting field 63, preset style setting field 64, and cabinet setting field 65 respectively, then the CPU 10 displays the following: a recording end time in minutes in the recording end time setting field 62; one of the three modes (high quality, standard, video CD compatible) in the recording mode setting field 63; wording indicative of either a one-time preset recording session, or a plurality of times recording is to be made in a periodical preset recording session, in the preset style setting field 64; and a selected cabinet name in the cabinet setting field 65.

Unless otherwise specified, the cabinet setting field 65 indicates a predetermined cabinet name such as "Temporary storage." If any of cabinets representative of different categories such as news, sports, dramas and movies covering preset TV programs is selected, the selected cabinet name (i.e., category name) is displayed alongside of the "Temporary storage" cabinet name.

After displaying the recording end time, recording mode, preset style, and cabinet name on the second unattended recording preset screen 51, the CPU 10 displays the following items in the disc use status display area 66: a recording time period derived from the recording start and end times in effect; a required disc capacity on the hard disc for accommodating the quantity of data constituted by the preset TV program (i.e., quantity of the compression-coded data D2 of the program in question); and an available disc capacity left on the hard disc after recording of the TV program.

The second unattended recording preset screen 51 also comprises a help button 67, a cancel button 68 for canceling settings, a previous-page button 69 (Back) for restoring the first unattended recording preset screen 50, and a next-page button 70 (Next) for reaching the next page. Clicking on the next-page button 70 with the mouse 18 causes the CPU 10 to display the third unattended recording preset screen 52 in place of the second unattended recording preset screen 51 on the display unit 19.

A preset content confirmation area 71 is included in the third unattended recording preset screen 52. The CPU 10 displays in the area 71 what has been set in the first and the second unattended recording preset screens 50 and 51 and prompts the user to confirm the settings.

The third unattended recording preset screen 52 includes a memo button 72. Clicking on the memo button 72 with the mouse 18 causes the CPU 10 to bring about a state in which comments on the preset TV program of interest may be input. Any comment on the content, cast, and other details of the preset TV program may be entered from the keyboard 17. The input comment is displayed as part of the preset information on the third unattended recording preset screen 52.

The third unattended recording preset screen 52 also comprises a help button 73, a cancel button 74 for canceling settings, a previous-page button 75 (Back) for restoring the second unattended recording preset screen 51, and an OK button 76. Clicking on the OK button 76 with the mouse 18 causes the CPU 10 to finalize the preset information displayed on the third unattended recording preset screen 52, to create unattended recording preset data based on the finalized preset information in order to secure regions on the hard disc of the HDD 20 necessary for recording the target TV program, and to record the unattended recording preset data thus created onto the hard disc of the HDD 20 in accordance with the recording/reproducing program P6.

In keeping with the preset monitoring program P3, the CPU 10 thereafter waits for the recording start time in the unattended recording preset data to be reached. When the start time has arrived, the CPU 10 starts recording the selected TV program based on the unattended recording preset data in accordance with the recording/reproducing program P6.

If program list data are acquired by the WWW browser P1 from the relevant Internet service provider for use in creating unattended recording preset data, the CPU 10 displays a program list screen 77 on the display unit 19 based on the program list data, as depicted in FIG. 10.

The program list screen 77 comprises a program list display area 79 that displays illustratively a program list 78 made up of TV programs on a plurality of channels broadcast in a single day. Also included in the screen 77 are scroll bars 80 and 81 for scrolling the program list 78 in the program list display area 79. A back button 82 is provided to permit returning to the display in effect immediately before the program list 78 was scrolled by use of the scroll bar 80 or 81.

The program list screen 77 contains selection buttons 83 represented illustratively by a character "R" indicative of each TV program in the program list 78. Clicking on any one of the selection buttons 83 with the mouse 18 causes the CPU 10 to retrieve from the program list data such information as a broadcast start time (i.e., recording start time), a broadcast end time (recording end time), a program name, and a channel name of the TV program corresponding to the operated selection button 83.

Following information retrieval from the program list data, the CPU 10 displays the information comprising the broadcast start time, broadcast end time, program name, and channel name of the TV program of interest onto the first through the third unattended recording preset screens 50 through 52. The screens 50 through 52 are made to appear successively on the display unit 19, prompting the user to establish a recording mode, a preset style and a cabinet name as well as to enter any comment if desired.

In the manner described above, the CPU 10 can create unattended recording preset data by allowing most of the preset items for unattended recording to be established easily and accurately using the program list data.

Figures 11, 12:
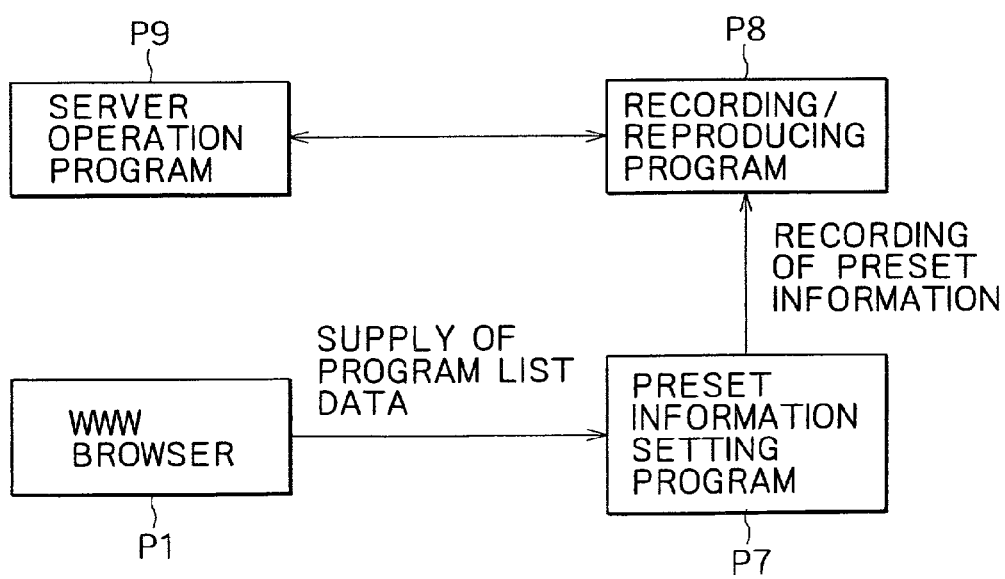
FIG. 11 is a schematic view expressing a typical structure of supplementary information/data.
FIG. 12 is a schematic view explaining programs installed in the personal computer.

When a TV program is recorded, the CPU 10 extracts two kinds of data as index information about the TV program in question from the video/audio data D1 of the program in accordance with the managing/searching program P4 active in the RAM 11. One of the two kinds of data is still picture data representing a first frame of each changed scene in the TV program; the other kind of data is switching position data consisting of a time code at the beginning of each changed scene. Besides the index information, as illustrated in FIG. 11, the CPU 10 extracts from the corresponding recording condition data or unattended recording preset data such preset program information as a program name, a date and a time of recording, a recording time period, a channel number, a recording mode, and a comment regarding the TV program in question.

Eventually, the CPU 10 creates supplementary information/data by supplementing the extracted index information and preset program information with update information that is constituted by a date and a time of the preceding reproduction, i.e., information about the last time the TV program of interest was reproduced, and by an end position of the preceding reproduction. The preset program information includes a date and a time at which the supplementary information/data were created.

After creating the information/data, the CPU 10 records the supplementary information/data to the hard disc of the HDD 20 in correspondence with the compression-coded data D2 of the TV program by resorting to the recording/ reproducing program P6 active in the RAM 11. Using the managing/searching program P4 active in the RAM 11, the CPU 10 manages the compression-coded data D2 and supplementary information/data associated with each TV program (each set of such associated data is called a video capsule).

Figure 6:
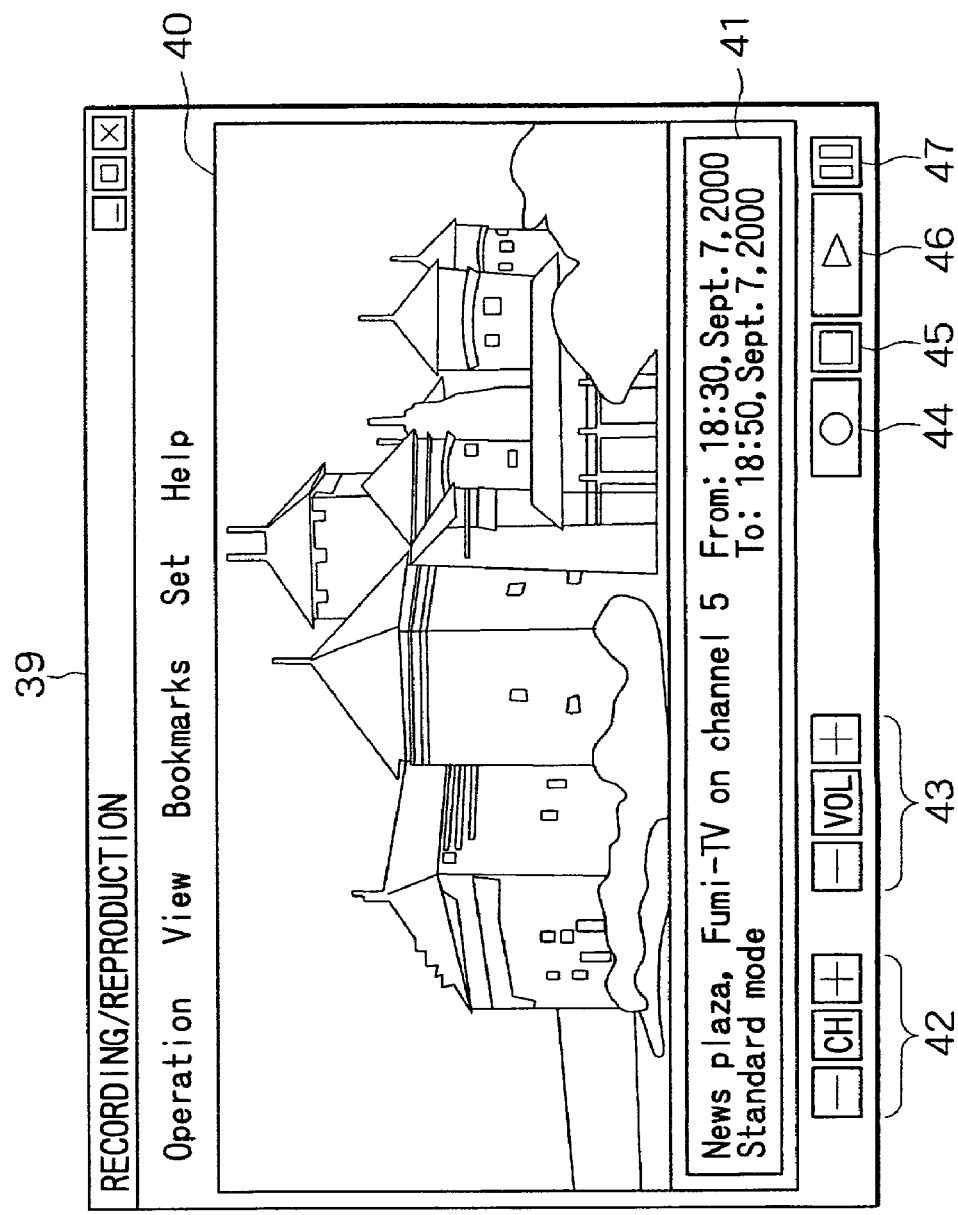
FIG. 6 is a schematic view indicating a typical structure of a program display screen.

When an instruction for displaying the program display screen 39 (discussed above with reference to FIG. 6) is issued from the keyboard 17 or mouse 18 after recording of a TV program, the CPU 10 displays the program display screen 39 on the display unit 19 in accordance with the recording/reproducing program P6 active in the RAM 11. If any of the play button 46, stop button 45 and pause button 47 is clicked on with the mouse 18 on the program display screen 39 thus displayed, a TV program image is reproduced for display or otherwise manipulated in the program display area 40 according to the clicking operation performed.

During reproduction of a TV program, the CPU 10 causes a list of recorded TV programs to appear illustratively in the recording condition setting area 41 based on the supplementary information/data. The display allows the user to select a desired TV program from the list.

The WWW browser P1, a preset information setting program P7, a recording/reproducing program P8, and a server operation program P9 stored on the hard disc of the HDD 36 in each of the personal computers $4_1$ through $4_N$ are related with one another, as shown in FIG. 12. The WWW browser 1 held on the HDD 36 is the same program as the WWW browser 1 in the server apparatus 2.

The preset information setting program P7 is a program for establishing preset information needed to preset TV programs for unattended recording.

The recording/reproducing program P8 records and retrieves, to and from the hard disc of the HDD 36, both the compression-coded data D2 of any TV program sent from the server apparatus 2 along with the associated supplementary information/data (i.e., video capsule), and preset information/data created by the preset information setting program P7. For reproduction, the recording/reproducing program P8 subjects the compression-coded data D2 of the desired TV program to the decompression decoding process corresponding to the compression coding format in use.

The server operation program P9 is a program that permits exchanges of various data such as the compression-coded data D2 of TV programs between each personal computer and the server apparatus 2.

Using the preset information setting program P7 active in the RAM 11, the CPU 35 of the personal computers $4_1$ through $4_N$ displays successively the first through the third unattended recording preset screens 50 through 52 and the program list screen 77 (discussed above with reference to FIGS. 7 through 10). The successive display prompts the user to input various items of preset information as in the case of the CPU 10 of the server apparatus 2. When the preset information for unattended recording is eventually displayed and confirmed in the preset content confirmation area 71 on the third unattended recording preset screen 52, the preset information is recorded to the hard disc of the HDD 36 as the data necessary for presetting the TV program of interest for unattended recording.

In the manner described, the CPU 35 creates on its own the preset information/data necessary for presetting desired TV programs for unattended recording, and stores the information/data thus created onto the hard disc of the HDD 36.

Figure 13:
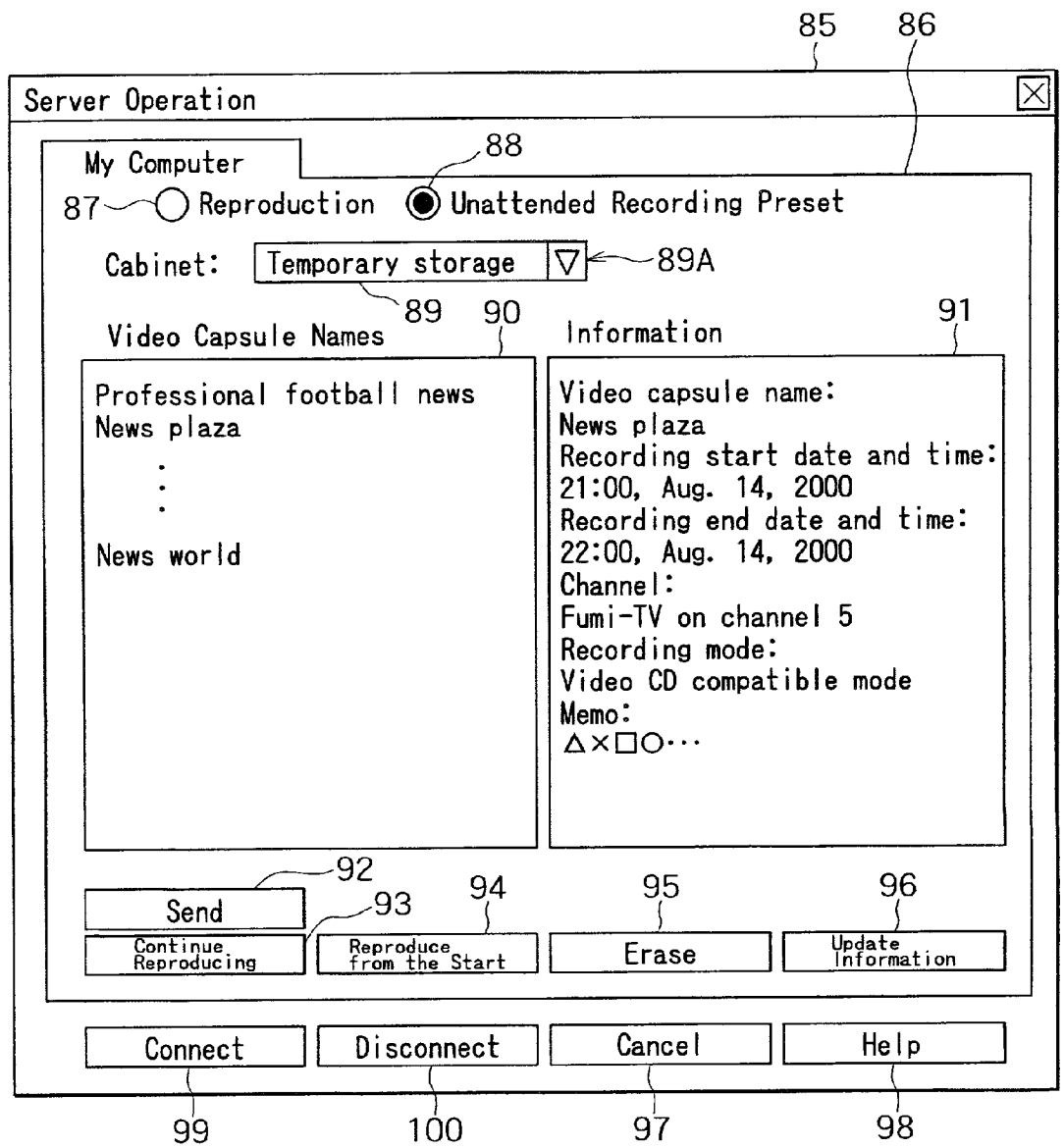
FIG. 13 is a schematic view representing a typical structure of a server operation screen.

If an instruction for displaying a screen in which to operate the server apparatus 2 is entered from the keyboard 17 or mouse 18, the CPU 35 causes a server operation screen 85 to appear on the display unit 19 in accordance with the server operation program P9 active in the RAM 11, as shown in FIG. 13.

The server operation screen 85 comprises a my-computer operation part 86 on each of the personal computers $4_1$ through $4_N$. The my-computer operation part 86 contains a reproduction operation selection button 87 for selecting a reproduction operation mode, an unattended recording preset operation selection button 88 for selecting an unattended recording preset operation mode, a cabinet display area 89, a video capsule name display area 90, an information display area 91, a send button 92, a continue-reproducing button 93, a reproduce-from-the-start button 94, an erase button 95, and an information update button 96.

If the unattended recording preset operation selection button 88 is clicked on with the mouse 18, the CPU 35 enters the unattended recording preset operation mode. In this mode, the CPU 35 retrieves from the hard disc of the HDD 36 all preset information/data managed illustratively under the cabinet name "Temporary storage," displays in the video capsule name display area 90 a list of all TV programs preset for unattended recording based on the retrieved preset information/data, and causes the information display area 91 to display the preset information about the TV program at the top of the program name list.

Every time a mouse cursor (not shown) is positioned by operation of the mouse 18 onto the name of a desired TV program in the list displayed in the video capsule name display area 90, the CPU 35 causes the information display area 91 to display by turns the content of the preset information/data about each program name thus pointed to by the cursor.

If a selection button 89A to the right of the cabinet display area 89 is clicked on with the mouse 18, the CPU 35 reveals a pull-down menu (not shown) composed of a plurality of cabinet names. If any desired cabinet name is selected by a click of the mouse 18 from the pull-down menu, the CPU 35 retrieves from the hard disc of the HDD 36 all preset information/data managed under the selected cabinet name for display in the information display area 91 while maintaining the program name list in the video capsule name display area 90.

In the state where any one of the TV programs displayed in list form in the video capsule name display area 90 is selected by a click of the mouse 18, clicking on the erase button 95 with the mouse 18 erases the preset information/data corresponding to the selected program name.

As described, the CPU 35 allows preset information/data for unattended recording of TV programs to be displayed and confirmed by turns by operation of the my-computer operation part 86 in the server operation screen 85. Furthermore, the CPU 35 allows preset information/data to be erased where necessary.

Figure 14:
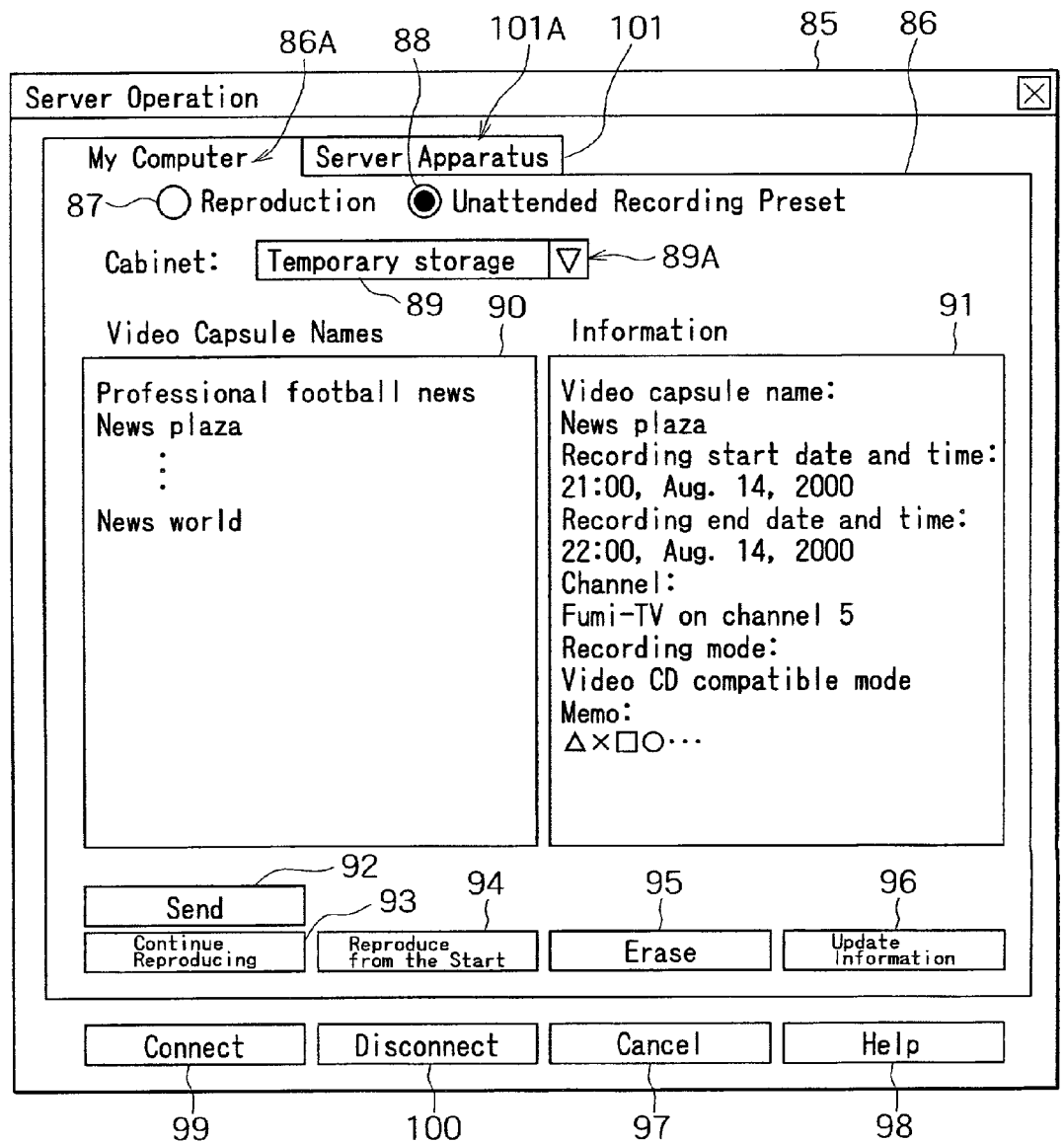
FIG. 14 is a schematic view exhibiting a typical structure of a server operation screen in effect when a state of communication is secured with regard to the server apparatus.

At the bottom of the server operation screen 85 are a cancel button 97, a help button 98, a connect button 99 for securing a state of communication with the server apparatus 2, and a disconnect button 100 for canceling the communication state with the server apparatus 2. When the connect button 99 is clicked on with the mouse 18 in the server operation screen 85, the CPU 35 secures a state of communication with the server apparatus 2 and, as shown in FIG. 14, causes a server apparatus operation part 101 for the server apparatus 2 to appear at the back of and in overlapping relation with the my-computer operation part 86 on the server operation screen 85.

With the state of communication with the server apparatus 2 established, suppose that one of the program names listed in the video capsule name display area 90 is selected by a click of the mouse 18, followed by another click of the mouse on the send button 92. In that case, the CPU 35 sends the preset information/data corresponding to the selected program name to the server apparatus 2 over the LAN 3.

Given the preset information/data from any one of the personal computers 4₁ through 4_N, the CPU 10 of the server apparatus 2 creates unattended recording preset data accordingly. At the same time, the CPU 10 secures regions on the hard disc of the HDD 20 for recording the TV program defined by the created data.

It can happen that the CPU 10 of the server apparatus 2, after creating the unattended recording preset data based on the preset information/data from one of the personal computers 4₁ through 4_N, finds it difficult to secure sufficient regions on the hard disc of the HDD 20 for accommodating the TV program defined by the created data. In such a case, the CPU 10 sends to the personal computer (one of 4₁ through 4_N) having sent the preset information/data an error message saying that the insufficient storage capacity available on the hard disc of the HDD 20 makes the presetting for unattended recording impossible.

Users of the personal computers 4₁ through 4_N are thus able to preset easily and reliably desired TV programs for unattended recording by means of the server apparatus 2.

Figure 15:
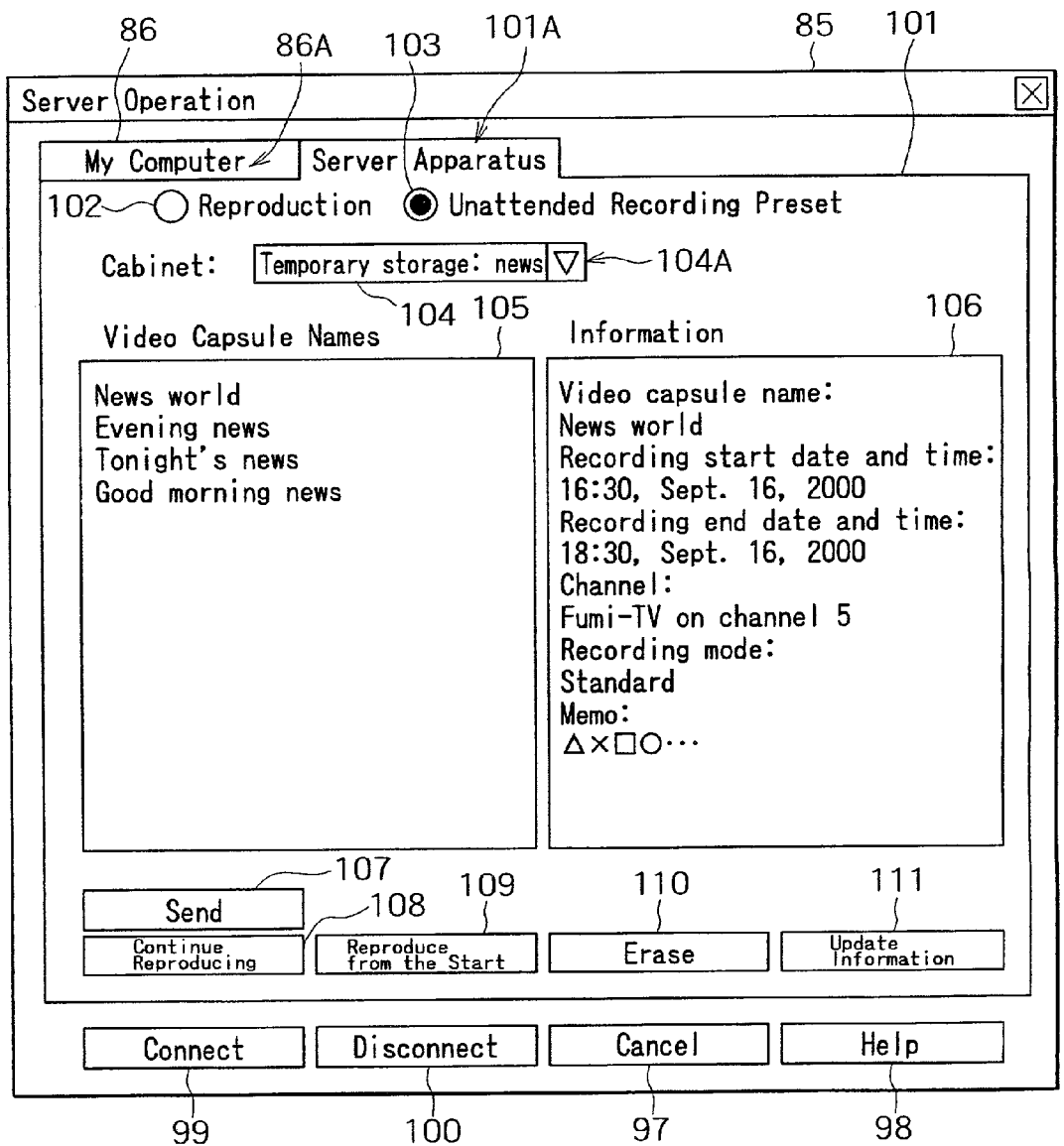
FIG. 15 is a schematic view showing a typical structure of a server operation screen where a server apparatus operation part is displayed in the foreground.

The server apparatus operation part 101, placed at the back of and in overlapping relation with the my-computer operation part 86 on the server operation screen 85, has its selection button 101A indicated alongside of a selection button 86A of the my-computer operation part 86. In that state, clicking on the selection button 101A with the mouse 18 causes the CPU 35 of the personal computers 4₁ through 4_N to display the sever apparatus operation part 101 in front of and in overlapping relation with the my-computer operation part 86 on the server operation screen 85, as shown in FIG. 15.

As with the my-computer operation part 86, the server apparatus operation part 101 contains a reproduction operation selection button 102 for selecting the reproduction operation mode, an unattended recording preset operation selection button 103 for selecting the unattended recording preset operation mode, a cabinet display area 104, a video capsule name display area 105, an information display area 106, a send button 107, a continue-reproducing button 108, a reproduce-from-the-start button 109, an erase button 110, and an information update button 111.

If the unattended recording preset operation selection button 103 is clicked on with the mouse 18, the CPU 35 enters the unattended recording preset operation mode. When a selection button 104A to the right of the cabinet display area 104 is clicked on with the mouse 18, the CPU 35 displays a pull-down menu (not shown) composed of a plurality of cabinet names. If any desired cabinet name is selected by a click of the mouse 18 from the pull-down menu, the CPU 35 displays the selected cabinet name in the cabinet display area 104.

In that state, a click with the mouse 18 on the send button 107 in the server apparatus operation part 101 causes the CPU 35 to send a preset status list transmission request associated with the selected cabinet name to the server apparatus 2 over the LAN 3.

Given the preset status list transmission request from any one of the personal computers 4₁ through 4_N, the CPU 10 of the server apparatus 2 transmits a preset status list to the requesting PC over the LAN 3. The preset status list is composed of all unattended recording preset data managed under the selected cabinet name on the hard disc of the HDD 20.

Upon acquiring the preset status list sent from the server apparatus 2, the CPU 35 of the requesting PC (one of 4₁ through 4_N) displays in list form all program names designated in the preset status list inside the video capsule name display area 105 of the server apparatus operation part 101. At the same time, the CPU 35 causes the information display area 106 to display the preset information regarding the TV program at the top of the program name list.

Every time the mouse cursor (not shown) is positioned by operation of the mouse 18 onto the name of a desired TV program in the list displayed in the video capsule name display area 105, the CPU 35 causes the information display area 106 to display by turns the content of the preset information about each program name thus pointed to by the cursor.

In the manner described, the CPU 35 in each of the personal computers 4₁ through 4_N allows the user to confirm the status of TV programs preset for unattended recording by means of the server apparatus 2.

Where any one of the TV programs displayed in the video capsule name display area 105 is selected by a click of the mouse 18, another click with the mouse 18 on the erase button 110 causes the CPU 35 to erase the selected program name from the area 105 and the corresponding preset information from the information display area 106. At the same time, the CPU 35 transmits an unattended recording preset data erase request corresponding to the program name designated for erasure to the server apparatus 2 over the LAN 3. In turn, the server apparatus 2 erases the unattended recording preset data requested to be erased.

The server apparatus 2 is capable of simultaneously establishing states of communication with a plurality of personal computers 4₁ through 4_N. In that setup, it may happen that one of the personal computers 4₁ through 4_N had earlier sent an unattended recording preset data erase request corresponding to a given program name to the server apparatus 2 so that the server already erased the data in question, before another configured PC requests transmission or erasure of the same data based on the preset status list acquired from the server apparatus 2.

If that happens, the CPU 10 of the server apparatus 2 sends an error message to the second PC soliciting the transmission or erasure of the unattended recording preset data. The error message says the CPU 10 is incapable of transmitting the unattended recording preset data in question to the subsequently-requesting PC.

Upon receipt of the error message, the CPU 35 of the second-requesting PC (one of 4₁ through 4_N) displays the message illustratively in the information display area 106 of the server apparatus operation part 101 on the server operation screen 85. Concurrently, the CPU 35 causes the speakers 22 to emit a predetermined sound indicative of the error reported by the message, informing the user of the inability to acquire the unattended recording preset data of interest.

In the state above, a click with the mouse 18 on the information update button 111 causes the CPU 35 of the personal computer (4₁ through 4_N) to again send a preset status list transmission request to the server apparatus 2 over the LAN 3. The most recent preset status list thus acquired from the server apparatus 2 is displayed in the server apparatus operation part 101 on the server operation screen 85.

Figure 16:
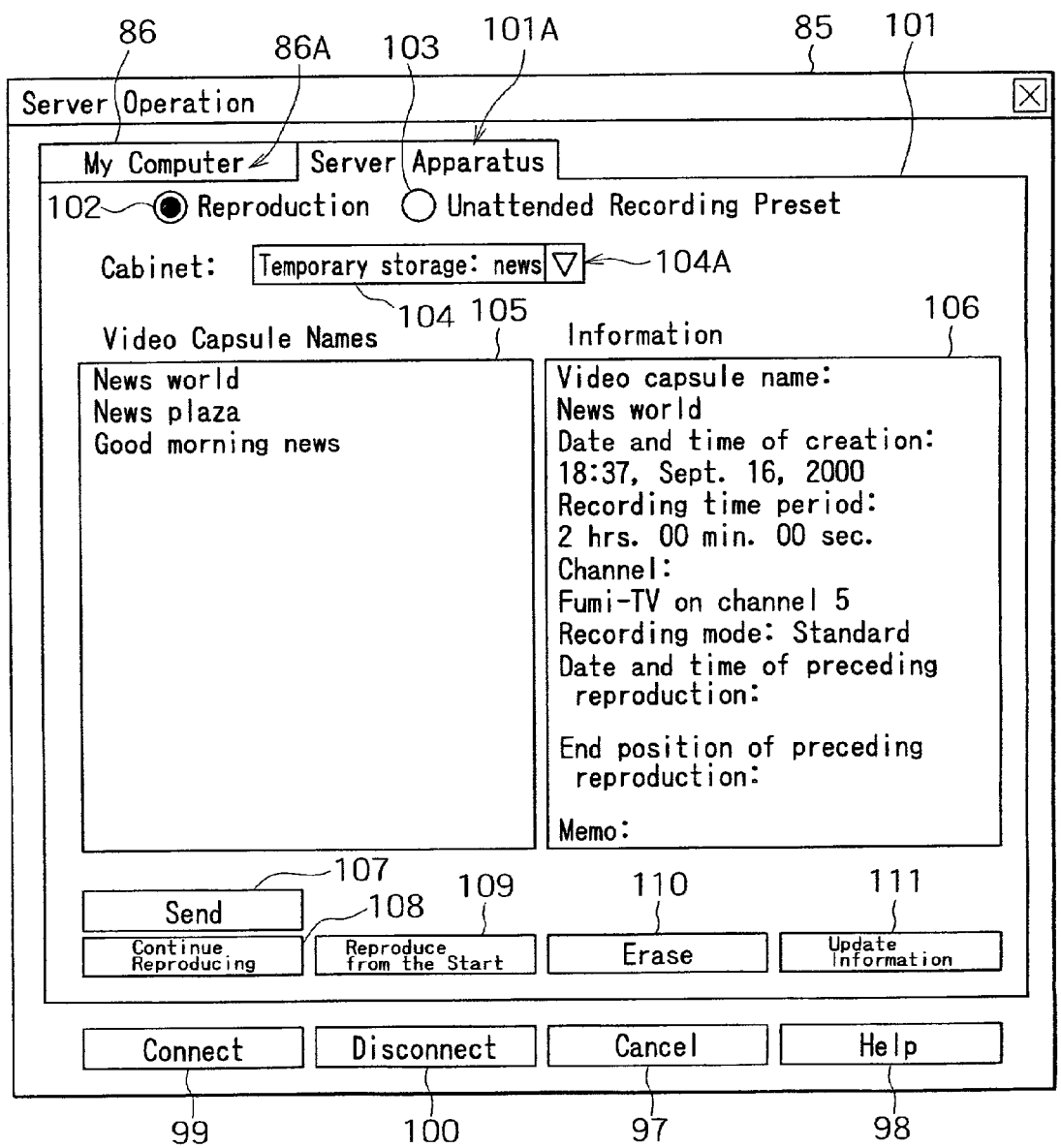
FIG. 16 is a schematic view depicting a typical structure of a server operation screen in effect when a reproduction operation selection button is operated in the server apparatus operation part.

Meanwhile, with the server apparatus operation part 101 displayed in front of and in overlapping relation with the my-computer operation part 86 on the server operation screen 85 as shown in FIG. 16, a click with the mouse 18 on the reproduction operation selection button 102 causes the CPU 35 of the personal computer ($4_1$ through $4_N$) to enter the reproduction operation mode. Another click of the mouse 18 on the selection button 104A to the right of the cabinet display area 104 causes the CPU 35 to display a pull-down menu (not shown) composed of a plurality of cabinet names. If any desired cabinet name is selected by a click of the mouse 18 from the pull-down menu, the CPU 35 displays the selected cabinet name in the cabinet display area 104.

In that state, a click with the mouse 18 on the send button 107 in the server apparatus operation part 101 causes the CPU 35 to send a recording status list transmission request associated with the selected cabinet name to the server apparatus 2 over the LAN 3.

Given the recording status list transmission request from any of the personal computers $4_1$ through $4_N$, the CPU 10 of the server apparatus 2 transmits a recording status list to the requesting PC over the LAN 3. This recording status list is composed of all supplementary information/data managed under the selected cabinet name on the hard disc of the HDD 20.

Upon acquiring the recording status list sent from the server apparatus 2, the CPU 35 in one of the personal computers $4_1$ through $4_N$ displays in list form all program names designated in the recording status list inside the video capsule name display area 105 of the server apparatus operation part 101. Simultaneously, the CPU 35 causes the information display area 106 to display the preset program information and update information in the supplementary information/data about the TV program at the top of the program name list.

Every time the mouse cursor (not shown) is positioned by operation of the mouse 18 onto the name of a desired TV program in the list displayed in the video capsule name display area 105, the CPU 35 causes the information display area 106 to display by turns the preset program information and update information in the supplementary information/data regarding each program name thus pointed to by the cursor.

In the manner described, the CPU 35 in each of the personal computers $4_1$ through $4_N$ allows the user to confirm the recording status of TV programs preset for unattended recording by means of the server apparatus 2.

Where any one of the TV programs displayed in the video capsule name display area 105 is selected by a click of the mouse 18, another click with the mouse 18 on the send button 107 causes the CPU 35 to send a video capsule transmission request associated with the selected TV program name to the server apparatus 2 over the LAN 3.

In response to the video capsule transmission request sent from any one of the personal computers $4_1$ through $4_N$, the CPU 10 of the server apparatus 2 reproduces the corresponding video capsule (composed of the compression-coded data D2 and supplementary information/data) from the hard disc of the HDD 20, and sends the video capsule to the requesting PC over the LAN 3.

Upon acquiring the video capsule sent from the server apparatus 2 in response to the transmission request, the CPU 35 of the requesting personal computer (one of $4_1$ through $4_N$) records the video capsule to the hard disc of the HDD 36.

When any one of the TV programs displayed in the video capsule name display area 105 is selected by a click of the mouse 18, another click with the mouse 18 on the erase button 110 causes the CPU 35 to erase the selected program name from the area 105 and the preset program information and update information in the supplementary information/data from the information display area 106. At the same time, the CPU 35 transmits a video capsule erase request corresponding to the program name designated for erasure to the server apparatus 2 over the LAN 3. In response, the server apparatus 2 erases the video capsule requested to be erased.

It may happen that one of the personal computers $4_1$ through $4_N$ had earlier sent a video capsule erase request to the server apparatus 2 so that the server already erased the video capsule in question, before another configured PC requests transmission or erasure of the same video capsule. If that happens, as in the case of the subsequent request for the transmission or erasure of unattended recording preset data as described by referring to FIG. 15, the server apparatus 2 sends an error message to the subsequently-requesting PC (one of $4_1$ through $4_N$). Upon receipt of the error message, the CPU 35 of the second-requesting PC displays the message illustratively in the information display area 106 on the server operation screen 85. Concurrently, the CPU 35 causes the speakers 22 to emit a predetermined sound indicative of the error reported by the message.

In the state above, a click of the mouse 18 on the information update button 111 causes the CPU 35 to again send a recording status list transmission request to the server apparatus 2 over the LAN 3. The most recent recording status list thus acquired from the server apparatus 2 is displayed in the server apparatus operation part 101 on the server operation screen 85.

Figure 17:
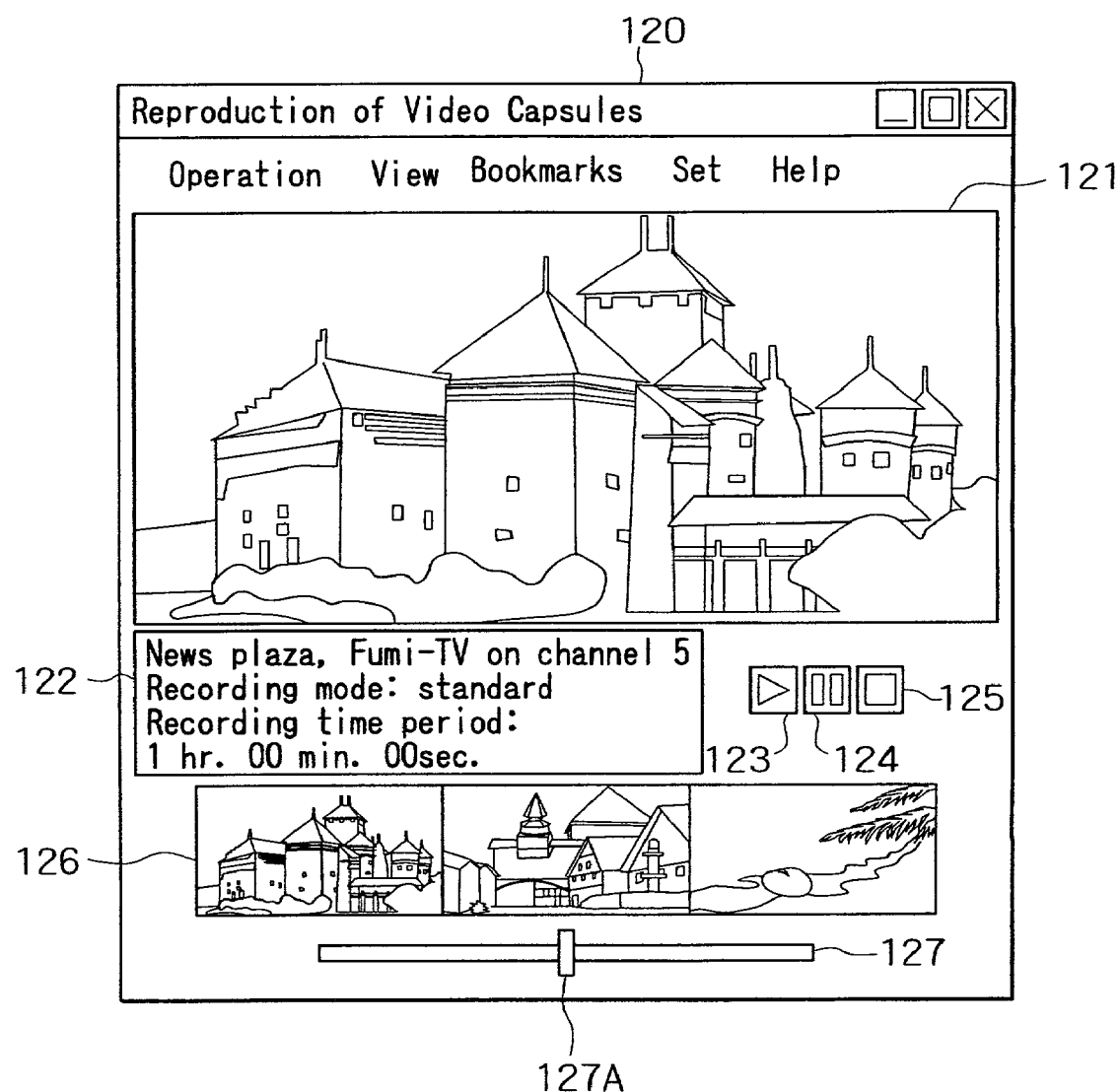
FIG. 17 is a schematic view illustrating a typical structure of a reproduction operation screen.

When any one of the program names in the video capsule name display area 105 in the server apparatus operation part 101 is selected by a click of the mouse 18, followed by a click with the mouse on the reproduce-from-the-start button 109, the CPU 35 of the personal computer ($4_1$ through $4_N$) replaces the server operation screen 85 with a reproduction operation screen 120 on the display unit 19, as shown in FIG. 17.

The reproduction operation screen 120 contains a program display area 121, an information display area 122, a play button 123, a pause button 124, a stop button 125, an index display area 126, and a slider 127.

On the reproduction operation screen 120, the CPU 35 displays in the information display area 122 the preset program information in the supplementary information/data corresponding to the TV program name selected earlier on the server operation screen 85. In this state, a click of the mouse 18 on the play button 123 causes the CPU 35 to send a reproduction request to the server apparatus 2 over the LAN 3, the request soliciting playback from the start of the video capsule in question.

Upon receipt of the reproduction request from one of the personal computers $4_1$ through $4_4$, the CPU 10 of the server apparatus 2 reproduces from the hard disc of the HDD 20 the compression-coded data D2 of the video capsule in question successively from the start and transmits what is reproduced to the requesting PC over the LAN 3. At the same time, the CPU 10 reproduces the supplementary information/data about the video capsule from the hard disc of the HDD 20 and transmits what is reproduced to the requesting PC over the LAN 3.

The CPU 35 of the requesting PC ($4_1$ through $4_N$) decodes through decompression the compression-coded data D2 successively from the start after receiving the data D2 from the server apparatus 2. Video data D3A are derived from the decompression decoding process and sent to the display unit 19. This allows images of the TV program reproduced by the server apparatus 2 to appear in real time from the start in the program display area 121 on the reproduction operation screen 120. Simultaneously, audio data D3B derived from the compression-coded data D2 through decompression decoding are fed successively from the start to the speakers 22. The video and audio data thus acquired permit synchronized playback of the images and sound of the TV program reproduced by the server apparatus 2.

During the reproduction, the CPU 35 outputs the index information in the corresponding supplementary information/data to the display unit 19. This causes a predetermined number of still pictures representing switched scenes from the reproduced TV program to appear chronologically in film fashion in the index display area 126 on the reproduction operation screen 120.

If a knob 127A of the slider 127 is dragged crosswise by operation of the mouse 18 on the reproduction operation screen 120, the CPU 35 shifts chronologically forward or backward the still pictures in the index display area 126 accordingly. With the mouse cursor positioned on one of the still pictures on display, a double-click of the mouse 18 causes the CPU 35 to send a reproduction request to the server apparatus 2 over the LAN 3, the request corresponding to switching position data of the still picture clicked on twice.

Given such a reproduction request from any one of the personal computers $4_1$ through $4_N$, the CPU 10 of the server apparatus 2 reproduces from the hard disc of the HDD 20 the compression-coded data D2 successively starting from the position indicated by the switching position data designated by the reproduction request. The compression-coded data D2 thus reproduced are sent to the requesting PC over the LAN 3.

In turn, the CPU of the requesting PC (one of $4_1$ through $4_N$) acquires video data D3A by subjecting the compression-coded data D2 from the server apparatus 2 to successive decompression decoding. The video data D3A thus obtained are output to the display unit 19. As a result, the image of the TV program currently displayed in the program display area 121 on the reproduction operation screen 120 is replaced by an image of the TV program whose still picture was double-clicked and which is now reproduced from the start. At the same time, audio data D3B also derived from the compression-coded data D2 through successive decompression decoding are fed to the speakers 22 for audio output in synchronism with the reproduced image starting from the newly switched scene.

Instead of having the slider 127 manipulated, the CPU 35 may permit the still pictures in the index display area 126 to be directly dragged forward or backward chronologically. If any of the play button 123, pause button 124 and stop button 125 is clicked on with the mouse 18, the CPU 35 transmits an operation instruction reflecting the operated button to the server apparatus 2 to control TV program reproduction. The program image is displayed in the image display area 121 according to such button operations, with the speakers 22 outputting sound in synchronism with the reproduced image.

In the manner described, each of the personal computers $4_1$ through $4_N$ allows the user to enjoy in real time any TV program reproduced by the server apparatus 2, as if the TV program is directly reproduced from the internal HDD 36 for real time playback by means of the display unit 19 and speakers 22.

If any TV program is reproduced as required by any of the personal computers $4_1$ through $4_N$ or if the TV program being reproduced is stopped before coming to its end, the CPU 10 of the server apparatus 2 updates the date and time and the end position of the preceding reproduction in the supplementary information/data regarding the video capsule in question.

Suppose that a TV program never reproduced after its recording or a TV program previously reproduced to its end is selected as the target program for playback. In such a case, the CPU 35 of the personal computer in question ($4_1$ through $4_N$) changes button functions in the server operation screen 35 based on the supplementary information/data. Specifically, the CPU 35 places the reproduce-from-the-start button 109 (FIG. 16) on the screen 85 into a state selectable by operation of the mouse 18 while rendering the continue-reproducing button 108 inoperable, the button 108 being displayed illustratively in reverse video.

On the other hand, if any TV program stopped halfway during its preceding reproduction is selected for playback, the CPU 35 puts not only the reproduce-from-the-start button 109 (FIG. 16) but also the continue reproducing button 108 on the server operation screen 35 into a state selectable by operation of the mouse 18 in accordance with the relevant supplementary information/data.

When the continue-reproducing button 108 is clicked on with the mouse 18, the CPU 35 transmits a reproduction request to the server apparatus 2 over the LAN 3, the request reflecting the preceding reproduction end position in the supplementary information/data.

Upon receipt of such a transmission request, the server apparatus 2 reproduces accordingly the TV program in question from a halfway position at which its reproduction ended most recently; the compression-coded data D2 of the TV program are reproduced from the hard disc of the HDD 20 and transmitted to the requesting PC ($4_1$ through $4_N$). In response, the requesting personal computer displays on the reproduction operation screen 120 (FIG. 17) program images starting from the halfway end position in the TV program in question of its preceding reproduction.

In the manner described, the CPU 35 of each of the personal computers $4_1$ through $4_N$ allows the user to enjoy in real time any TV program reproduced by the server apparatus 2 from the beginning or from a halfway position of the preceding reproduction, as if the TV program in question is reproduced from a halfway-rewound videotape.

Figure 18:
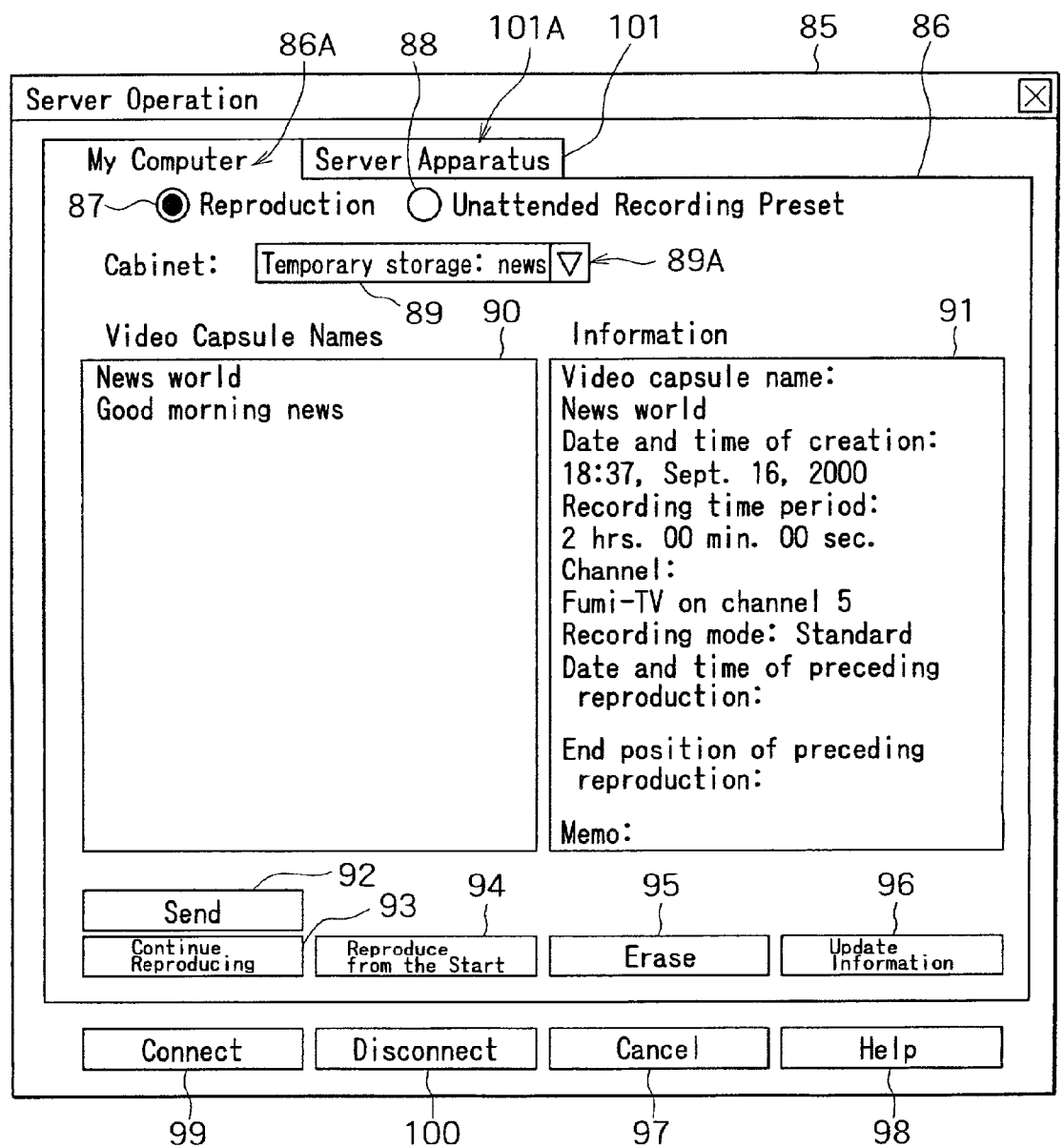
FIG. 18 is a schematic view indicating a typical structure of a server operation screen in effect when the reproduction operation selection button is operated in a my-computer operation part.

With the my-computer operation part 86 placed at the back of and in overlapping relation with the server apparatus operation part 101 on the server operation screen 85, a click on the selection button 86A with the mouse 18 causes the CPU 35 of the personal computers $4_1$ through $4_N$ to display the my-computer operation part 86 in front of and in overlapping relation with the sever apparatus operation part 101 on the server operation screen 85, as shown in FIG. 18.

Clicking on the reproduction operation selection button 87 with the mouse 18 causes the CPU 35 to enter the reproduction operation mode. When the selection button 89A to the right of the cabinet display area 89 is clicked on with the mouse 18, the CPU 35 displays a pull-down menu (not shown) composed of a plurality of cabinet names. If any desired cabinet name is selected by a click of the mouse 18 from the pull-down menu, the CPU 35 reproduces from the hard disc of the HDD 36 all supplementary information/data managed under the selected cabinet name, displays in list form all TV program names based on the reproduced supplementary information/data in the video capsule name display area 90, and indicates in the information display area 91 the preset program information and update information in the supplementary information/data regarding the program name at the top of the program name list.

Every time the mouse cursor (not shown) is positioned by operation of the mouse 18 onto the name of a desired TV program in the list displayed in the video capsule name display area 90, the CPU 35 causes the information display area 91 to display by turns the preset program information and update information in the supplementary information/data about each program name thus pointed to by the cursor.

In the manner described, the CPU 35 in each of the personal computers $4_1$ through $4_N$ allows the user to confirm the status of TV programs recorded on the hard disc of the HDD 36 in the PC.

Where any one of the TV programs displayed in the video capsule name display area 90 is selected by a click of the mouse 18, another click with the mouse 18 on the send button 92 causes the CPU 35 to reproduce the video capsule associated with the selected TV program name from the hard disc of the HDD 36 and transmit the reproduced video capsule to the server apparatus 2 over the LAN 3.

The CPU 10 of the server apparatus 2 receives any video capsule thus sent from any of the personal computers $4_1$ through $4_N$ and records the received video capsule onto the hard disc of the HDD 20 for storage.

When any one of the TV programs displayed in the video capsule name display area 90 is selected by a click of the mouse 18, another click with the mouse 18 on the erase button 95 causes the CPU 35 of the personal computer ($4_1$ through $4_N$) to erase the selected program name from the area 90 and the preset program information and update information in the supplementary information/data from the information display area 91. At the same time, the CPU 35 erases the video capsule associated with the designated program name from the hard disc of the HDD 36.

It may happen that the video capsule sent by the CPU 35 to the server apparatus 2 cannot be recorded by the latter because of an insufficient storage capacity of the hard disc in the HDD 20. In that case, an error message from the server apparatus 2 is displayed in the information display area 91 on the server operation screen 85, and a predetermined sound representative of the error message is emitted by the speakers 22 for warning.

If any desired TV program name is selected by a click of the mouse 18 from the video capsule name display area 90 in the my-computer operation part 86, and if the reproduce-from-the-start button 94 or the continue-reproducing button 108 is clicked on with the mouse 18, then the CPU 35 causes the reproduction operation screen 120 (FIG. 17) to appear on the display unit 19.

The CPU 35 reproduces from the hard disc of the HDD 36 the compression-coded data D2 of the video capsule in question from the start or from a halfway end position, and subjects the data D2 successively to decompression decoding to yield video data D3A. The video data D3A thus obtained are sent to the display unit 19. Simultaneously, audio data D3B also derived from the compression-coded data D2 through successive decompression decoding are fed to the speakers 22 for audio output. In this manner, as in the case of TV program reproduction from the server apparatus 2, the user may enjoy the TV program of any video capsule that may be recorded on the hard disc of the HDD 36.

Upon receipt of each transmission request and reproduction request from any one of the personal computers $4_1$ through $4_N$, the CPU 10 of the server apparatus 2 records the date, time and details of each request to the hard disc of the HDD 20 as history data. When a request for looking up the history is entered from the keyboard 17 and mouse 18, the accumulated data are displayed on the display unit 19 as a warning about, say, excess processing loads on the server apparatus 2.

Figure 19:
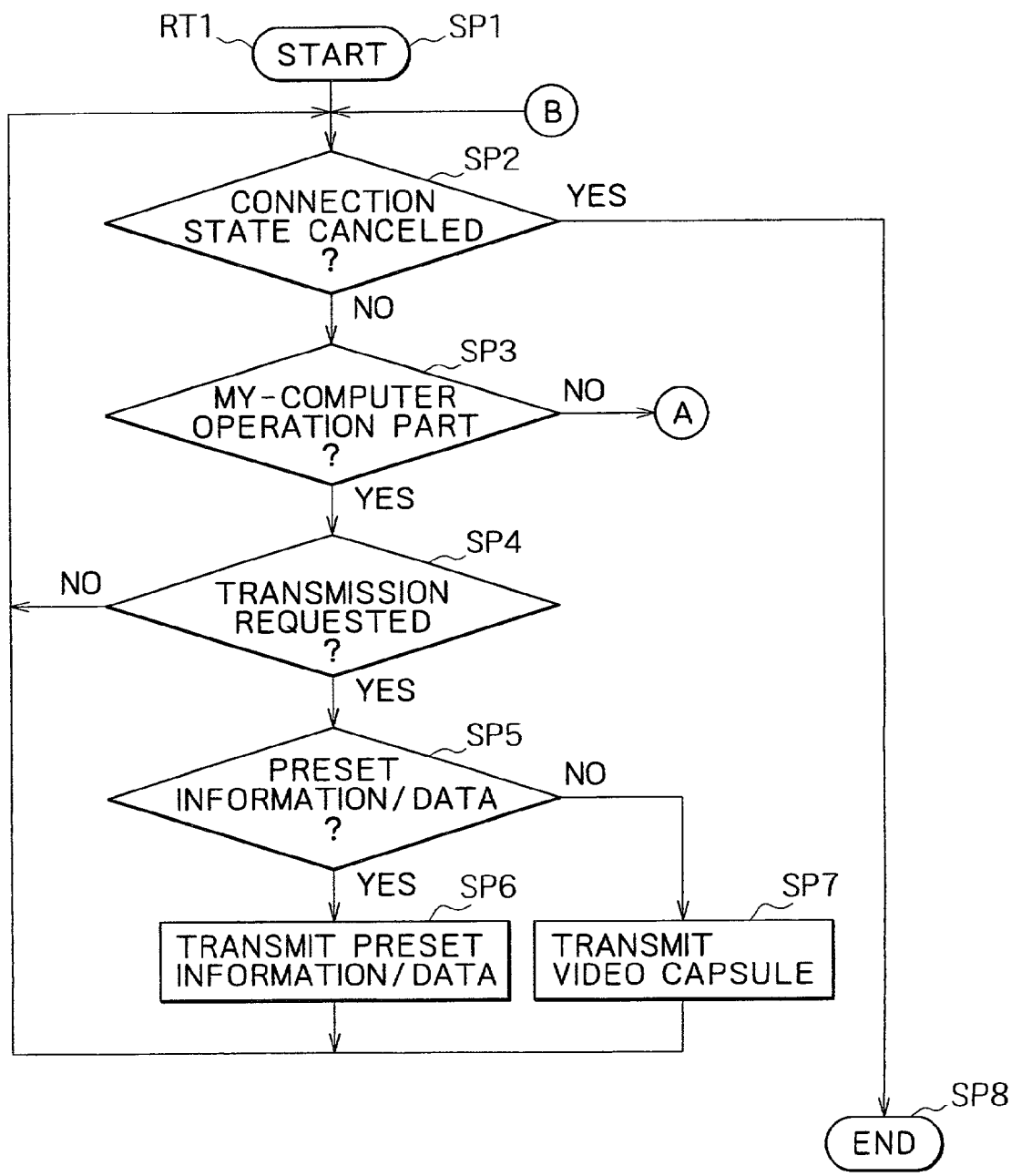
FIG. 19 is a flowchart of steps constituting a server operation procedure.
Figure 20:
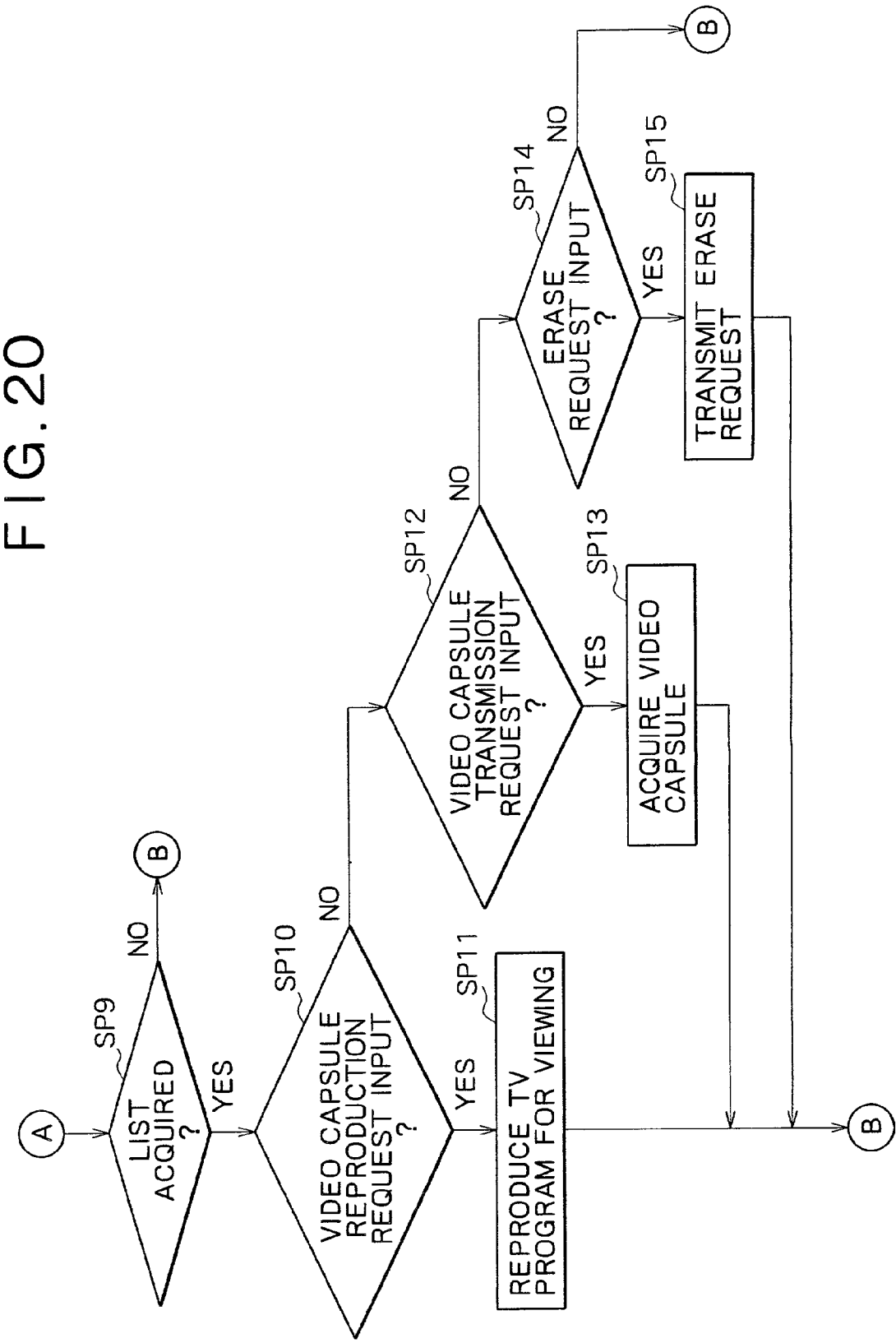
FIG. 20 is another flowchart of steps constituting the server operation procedure.

When the connect button 99 is clicked on with the mouse 18 in the server operation screen 85 on the display unit 19 so as to secure a state of communication with the server apparatus 2, the CPU 35 of any one of the personal computers $4_1$ through $4_N$ starts a server operation procedure (i.e., routine RT1) in step SP1 as shown in FIGS. 19 and 20 in accordance with the server operation program P9 active in the RAM 11. In step SP2, the CPU 35 checks to see if the state of communication with the server apparatus 2 is canceled.

If the result of the check in step SP2 is negative, that means the state of communication with the server apparatus 2 is still secured because the disconnect button 100 is not clicked on with the mouse 18 on the server operation screen 85. In that case, the CPU 35 goes to step SP3 and checks to see if the my-computer operation part 86 is displayed in front of and in overlapping relation with the server apparatus operation part 101 on the server operation screen 85.

If the result of the check in step SP3 is affirmative, that means the my-computer operation part 86 is displayed in front of and in overlapping relation with the server apparatus operation part 101 on the server operation screen 85. The CPU 35 then reaches step SP4 and checks to see if a data transmission request bound for the server apparatus 2 is input through the my-computer operation part 86.

If the result of the check in step SP4 is affirmative and if the unattended recording preset operation mode is in effect, that means a preset information/data transmission request is input through the my-computer operation part 86; if the reproduction operation mode is in effect, the affirmative result of the check in step SP4 signifies that a video capsule transmission request is input through the my-computer operation part 86. In any case, the CPU 35 goes to step SP5 and checks to see if the input transmission request is associated with preset information/data.

If the result of the check in step SP5 is affirmative, that means the transmission request input through the my-computer operation part 86 corresponds to preset information/data. In that case, the CPU 35 reaches step SP6 to reproduce the preset information/data designated through the my-computer operation part 86 from the hard disc of the HDD 36 and to transmit what is reproduced to the server apparatus 2 over the LAN 3. Step SP6 is followed by step SP2.

If the result of the check in step SP5 is negative, that means the transmission request input through the my-computer operation part 86 is associated with a video capsule. In that case, the CPU 35 goes to step SP7 to reproduce the video capsule designated through the my-computer operation part 86 from the hard disc of the HD 36 and to send the reproduced video capsule to the server apparatus 2 over the LAN 3. Step SP7 is followed by step SP2.

If the result of the check in step SP2 is affirmative, that means a click of the mouse 18 on the disconnect button 100 on the server operation screen 85 has canceled the state of communication with the server apparatus 2. In that case, the CPU 35 reaches step SP8 to terminate the server operation routine RT1.

If the result of the check in step SP4 is negative, that means no transmission request is input through the my-computer operation part 86. In that case, the CPU 35 returns to step SP2 from step SP4.

As described, with the my-computer operation part 86 displayed in front of and in overlapping relation with the server apparatus operation part 101 on the server operation screen 85, the CPU 35 repeats a loop spanning steps SP2, SP3, SP4 and SP2 until the state of communication with the server apparatus 2 is canceled. During the loop, the CPU 35 waits for a transmission request to be entered through the my-computer operation part 86. Once a transmission request is input through the operation part 86, the CPU 35 executes steps SP5, SP6 and SP7.

If the result of the check in step SP3 is negative, that means the server apparatus operation part 101 is displayed in front of and in overlapping relation with the my-computer operation part 86 on the server operation screen 85. In that case, the CPU 35 goes to step SP9 and checks to see if a preset status list or a recording status list is acquired from the server apparatus 2.

If the result of the check in step SP9 is affirmative and if the unattended recording preset operation mode is in effect, that means the preset status list is acquired from the server apparatus 2 so that a list of TV programs preset for unattended recording is displayed in the server apparatus operation part 101 on the server operation screen 85 along with the corresponding preset information; if the reproduction operation mode is in effect, the affirmative result of the check in step SP9 signifies that the recording status list is acquired from the server apparatus 2 so that a list of TV programs already recorded by the server apparatus 2 is displayed in the server apparatus operation part 101 on the server operation screen 85 together with the preset program information and update information in the supplementary information/data. In any case, the CPU 35 reaches step SP10 and checks to see if a video capsule reproduction request is input.

If the result of the check in step SP10 is affirmative, that means the request to reproduce a desired video capsule is input through the server apparatus operation part 101 in the reproduction operation mode. In that case, the CPU 35 reaches step SP11 to send the video capsule reproduction request designated through the server apparatus operation part 101 to the server apparatus 2 over the LAN 3. The video capsule reproduced by the server apparatus 2 is then acquired so that the user can enjoy in real time the TV program based on the video capsule. Step SP11 is followed by step SP2.

If the result of the check in step SP10 is negative, that means no video capsule reproduction request is input through the server apparatus operation part 101. In that case, the CPU 35 reaches step SP12 and checks to see if a video capsule transmission request is entered.

If the result of the check in step SP12 is affirmative, that means the request to transmit a desired video capsule is input through the server apparatus operation part 101 in the reproduction operation mode. In that case, the CPU 35 goes to step SP13 to transmit the video capsule transmission request designated through the server apparatus operation part 101 to the server apparatus 2 over the LAN 3. The video capsule sent from the server apparatus 2 is then acquired and recorded to the hard disc of the HDD 36. Step SP13 is followed by step SP2.

If the result of the check in step SP12 is negative, that means no video capsule transmission request is input through the server apparatus operation part 101. In that case, the CPU 35 reaches step SP14 and checks to see if a request to erase either unattended recording preset data or a video capsule is input.

If the result of the check in step SP14 is affirmative and if the unattended recording preset operation mode is in effect, that means the request to erase unattended recording preset data is input through the server apparatus operation part 101; if the reproduction operation mode is in effect, the affirmative result of the check in step SP14 signifies that the request to erase a video capsule is input through the server apparatus operation part 101. The CPU 35 then goes to step SP15 and transmits the unattended recording preset data erase request designated through the server apparatus operation part 101 to the server apparatus 2 over the LAN 3 if the unattended recording preset operation mode is in effect, or sends the video capsule erase request specified through the server apparatus operation part 101 to the server apparatus 2 over the LAN 3 if the reproduction operation mode is in effect. Step SP15 is followed by step SP2.

If the result of the check in step SP14 is negative, that means there is no input request soliciting the server apparatus 2 to erase unattended recording preset data or a video capsule. In that case, the CPU 35 returns to step SP2 from step SP14.

If the result of the check in step SP9 is negative, that means neither the preset status list nor the recording status list is acquired from the server apparatus 2. In that case, the CPU 35 returns to SP 2 from step SP9.

As described, with the server apparatus operation part 101 displayed in front of and in overlapping relation with the my-computer operation part 86 on the server operation screen 85, the CPU 35 repeats a loop spanning steps SP2, SP3, SP9 and SP2 until the state of communication with the server apparatus 2 is canceled. During the loop, the CPU 35 waits for a preset status list or recording status list transmission request to be entered through the server apparatus operation part 101. Once a transmission request is input, the CPU 35 executes steps SP10, SP12 and SP14, waiting for further requests to be entered with regard to the server apparatus 2 and carrying out processes corresponding to what is requested.

The CPU 35 complies with the recording/reproducing program P8 active in the RAM 11 when recording and reproducing unattended recording preset data or video capsules to and from the hard disc of the HDD 36 or when subjecting compression-coded data D2 derived from each video capsule to the decompression decoding process during the above steps constituting the server operation routine RT1.

Figure 21:
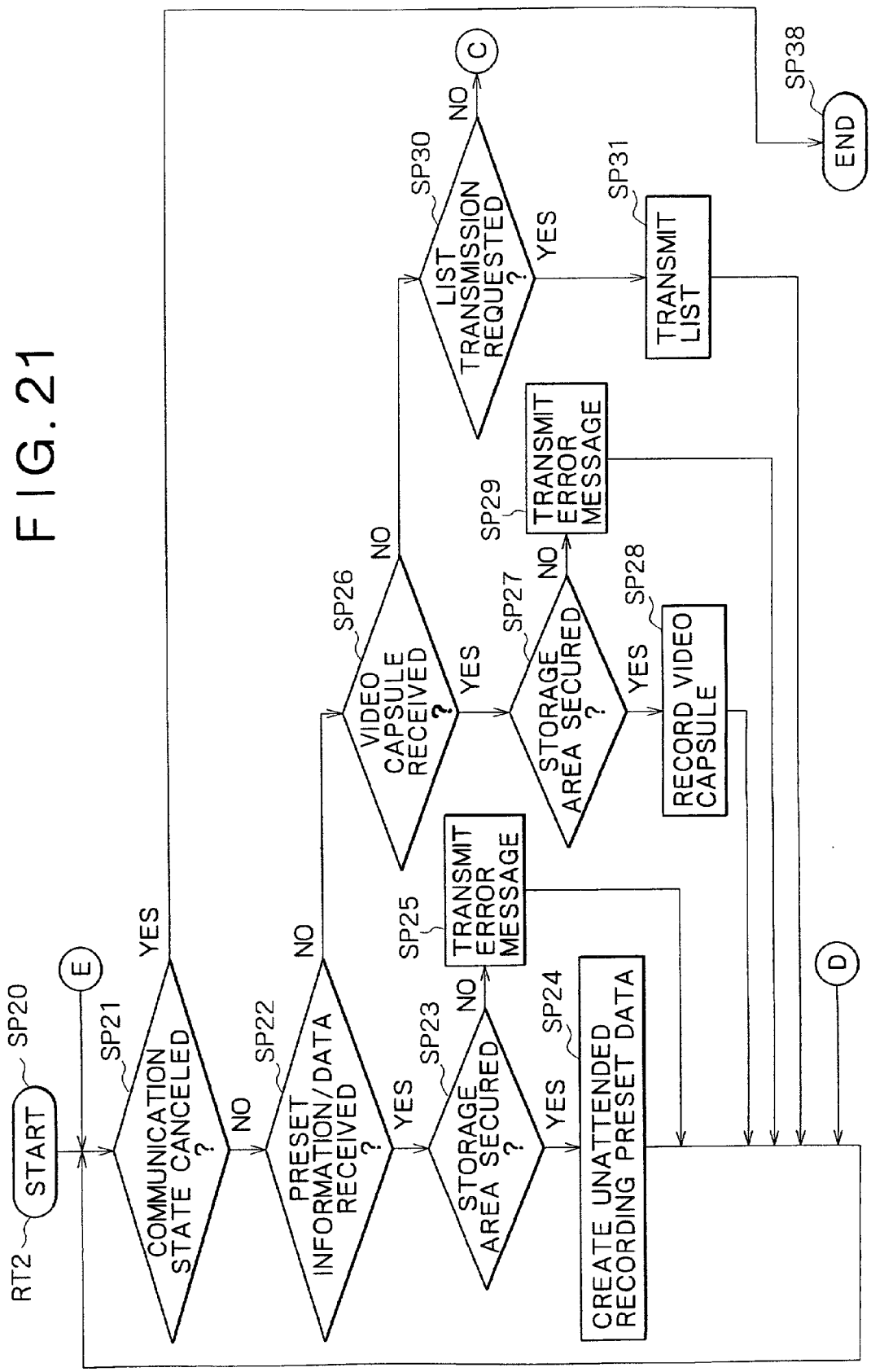
FIG. 21 is a flowchart of steps constituting a recording/reproduction procedure of the server apparatus.
Figure 22:
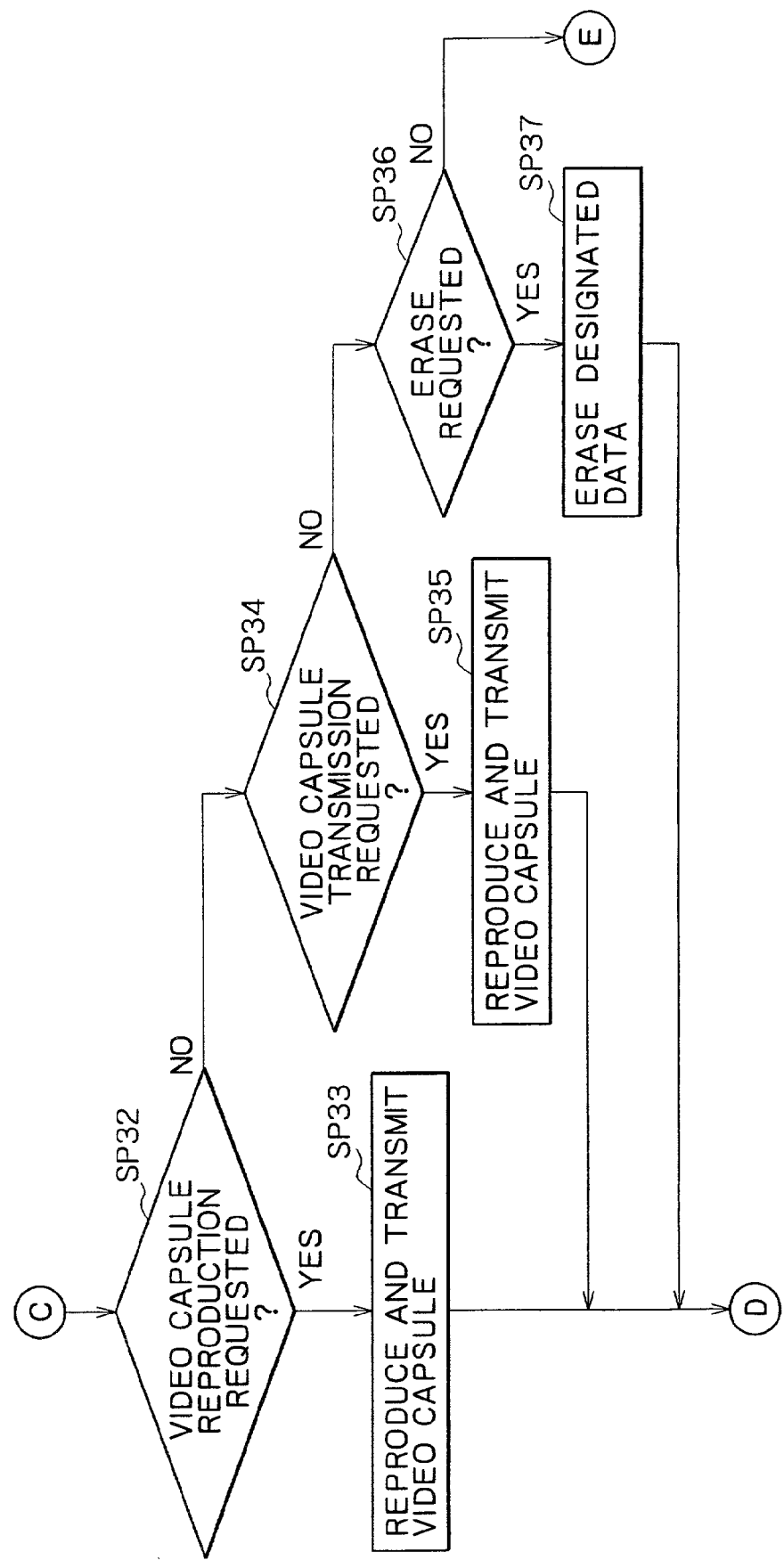
FIG. 22 is another flowchart of steps constituting the recording/reproduction procedure of the server apparatus.

Once the state of communication is secured with the personal computers $4_1$ through $4_N$, the CPU 10 of the server apparatus 2 starts a recording/reproduction procedure (i.e., routine RT2) in step SP20 in keeping with the recording/reproducing program P6 active in the RAM 11, as shown in FIGS. 21 and 22. In step SP21, the CPU 10 checks to see if the state of communication with the personal computers $4_1$ through $4_N$ is canceled.

If the result of the check in step SP21 is negative, that means the state of communication with the personal computers $4_1$ through $4_N$ is maintained. In that case, the CPU 10 goes to step SP22 and checks to see if preset information/data are received.

If the result of the check in step SP22 is affirmative, that means the preset information/data sent by any one of the personal computers $4_1$ through $4_N$ for creating unattended recording preset data are received via the image processing board 24. In that case, the CPU 10 reaches step SP23 and checks to see if a sufficient storage area can be secured on the hard disc of the HDD 20 for recording the target TV program designated by the preset information/data.

If the result of the check in step SP23 is affirmative, that means it is possible to allocate a sufficient storage area on the hard disc of the HDD 20 for recording the target TV program designated by the preset information/data. In that case, the CPU 10 reaches step SP24 and records to the hard disc of the HDD 20 the unattended recording preset data created from the preset information/data in accordance with the unattended recording presetting program P2 active in the RAM 11. Step SP24 is followed by step SP21.

If the result of the check in step SP23 is negative, that means it is impossible to allocate a sufficient storage area on the hard disc of the HDD 20 for recording the target TV program designated by the preset information/data even if the unattended recording preset data are created from the preset information/data. In that case, the CPU 10 goes to step SP25 and sends an error message over the LAN 3 to the PC (one of $4_1$ through $4_N$) having sent the preset information/data. The error messages says that the inability to secure sufficient regions on the hard disc of the HDD 20 for recording the target TV program makes it impossible to create the unattended recording preset data from the preset information/data. Step SP25 is followed by step SP21.

If the result of the check in step SP22 is negative, that means no preset information/data are sent from any of the personal computers $4_1$ through $4_N$. In that case, the CPU 10 reaches step SP26 and checks to see if a video capsule is received.

If the result of the check in step SP26 is affirmative, that means a video capsule sent from any one of the personal computers $4_1$ through $4_N$ is received via the image processing board 24. In that case, the CPU 10 goes to step SP27 and checks to see if a sufficient storage area can be secured on the hard disc of the HDD 20 for recording the video capsule in question.

If the result of the check in step SP27 is affirmative, that means a sufficient storage area is available on the hard disc of the HDD 20 for recording the video capsule. In that case, the CPU 10 reaches step SP28 and records the video capsule to the hard disc of the HDD 20. Step SP28 is followed by step SP21.

If the result of the check in step SP27 is negative, that means a sufficient storage area is not available on the hard disc of the HDD 20 for recording the video capsule in question. In that case, the CPU 10 goes to step SP29 and transmits over the LAN 3 an error message to the personal computer having transmitted the video capsule in question. The error message says that insufficient storage regions on the hard disc of the HDD 20 make it impossible to record the video capsule. Step SP29 is followed by step SP21.

If the result of the check in step SP26 is negative, that means no video capsule has been sent by any of the personal computers $4_1$ through $4_N$. In that case, the CPU 10 goes to step SP30 and checks to see if a preset status list or recording status list transmission request is received.

If the result of the check in step SP30 is affirmative, that means a preset status list or recording status list transmission request sent by one of the personal computers $4_1$ through $4_N$ is received through the image processing board 24. In that case, the CPU 10 reaches step SP31. In step SP31, the CPU 10 reproduces the relevant unattended recording preset data from the hard disc of the HDD 20 if the received request is a preset status list transmission request, creates the preset status list from the unattended recording preset data thus reproduced, and sends the created preset status list to the requesting PC; if the received request is a recording status list transmission request, the CPU 10 reproduces the supplementary information/data about the video capsule in question from the hard disc of the HDD 20, creates the recording status list based on the supplementary information/data thus reproduced, and transmits the created recording status list to the requesting PC. Step SP31 is followed by step SP21.

If the result of the check in step SP30 is negative, that means neither a preset status list transmission request nor a recording status list transmission request is sent from any of the personal computers $4_1$ through $4_N$. In that case, the CPU 10 goes to step SP32 and checks to see if a video capsule reproduction request is received.

If the result of the check in step SP32 is affirmative, that means a video capsule reproduction request from one of the personal computers $4_1$ through $4_N$ is received through the image processing board 24. In that case, the CPU 10 reaches step SP33 to reproduce the video capsule designated by the request from the hard disc of the HDD 20 and to transmit the reproduced video capsule to the requesting PC. Step SP33 is followed by step SP21.

If the result of the check in step SP32 is negative, that means no video capsule reproduction requestion is sent from any of the personal computers $4_1$ through $4_N$. In that case, the CPU 10 goes to step SP34 and checks to see if a video capsule transmission request is received.

If the result of the check in step SP34 is affirmative, that means a video capsule transmission request from one of the personal computers $4_1$ through $4_N$ is received through the image processing board 24. In that case, the CPU 10 reaches step SP35 to reproduce the video capsule designated by the transmission request from the hard disc of the HDD 20 and to transmit the reproduced video capsule to the requesting PC. Step SP35 is followed by step SP21.

If the result of the check in step SP34 is negative, that means no video capsule transmission request is sent from any of the personal computers $4_1$ through $4_N$. In that case, the CPU 10 goes to step SP36 and checks to see if a request to erase either unattended recording preset data or a video capsule is received.

If the result of the check in step SP36 is affirmative, that means a request to erase unattended recording preset data or a video capsule is received from one of the personal computers $4_1$ through $4_N$ via the image processing board 24. In that case, the CPU 10 reaches step SP37. If the received request is for erasure of unattended recording preset data, the CPU 10 erases the unattended recording preset data designated by the request from the hard disc of the HDD 20; if the received request is for erasure of a video capsule, the CPU 10 erases the video capsule designated by the request from the hard disc of the HDD 20. Step SP37 is followed by step SP21.

If the result of the check in step SP36 is negative, that means no request is sent from any of the personal computers $4_1$ through $4_N$ for erasing unattended recording preset data or a video capsule. In that case, the CPU 10 returns to step SP21 from step SP36.

As described, unless and until the state of communication with each of the personal computers $4_1$ through $4_N$ is canceled, the CPU 10 waits for requests from the PCs and performs relevant processes in response to such requests upon their receipt. If the state of communication with the personal computers $4_1$ through $4_N$ is judged canceled in step SP21, step SP38 is reached in which the CPU 10 terminates the recording/reproduction routine RT2.

In the setup discussed above, each of the personal computers $4_1$ through $4_N$ when making a request of the server apparatus 2 may execute an authentication process with the server over the LAN 3 using a password or suitable ID information unique to the server. With such an authentication scheme in place, unscrupulous parties other than the family members will not be able to readily alter unattended recording preset data or video capsules held in the server apparatus 2.

It is also possible to manage within the server apparatus 2 the video capsules and unattended recording preset data using ID information specific to each of the personal computers $4_1$ through $4_N$ or to each of the users operating the PCs. In such a setup, unattended recording preset data or video capsules, once preset for recording by any one user, will not be erased or altered by any other user.

In the home network system 1 described above, each of the configured personal computers $4_1$ through $4_N$ may be operated to create preset information/data necessary for presetting TV programs for unattended recording. The information/data thus created are transmitted over the LAN 3 to the server apparatus 2 capable of receiving TV broadcast.

The server apparatus 2 creates unattended recording preset data based on the preset information/data acquired from the personal computers $4_1$ through $4_N$ configured in the home network system 1. The unattended recording preset data thus created are recorded onto the hard disc of the HDD 20 and managed in that recorded state. Every time a recording start time of unattended recording preset data is reached, the TV program designated by the preset data in question is selectively recorded by the server apparatus 2.

In the home network system 1, any one of the personal computers $4_1$ through $4_N$ sends a TV program reproduction request to the server apparatus 2 over the LAN 3. In response, the server apparatus 2 reproduces the requested TV program and sends the reproduced program to the requesting PC. The TV program thus acquired is output in real time through the display unit 19 and speakers 22 of the personal computer in question.

Furthermore, the server apparatus 2 in the home network system 1 records a history of reproduced TV programs as update information, i.e., part of the supplementary information associated with each TV program recorded by the server. Based on that reproduction history, each of the personal computers $4_1$ through $4_N$ may reproduce a specified TV program from the start or from its halfway end position of the preceding reproduction.

In the household in which the home network system 1 is installed, each user may remotely operate the server apparatus 2 easily without going to the room where it is set up, using any one of the configured personal computers $4_1$ through $4_N$. In so doing, the user at any PC may preset TV programs for unattended recording or enjoy in real time TV programs reproduced by the server apparatus 2. Since all TV programs are recorded on the hard disc in the server apparatus 2, a plurality of personal computers $4_1$ through $4_N$ may gain access to the server and have their requests serviced simultaneously on a remote-controlled basis.

Whereas an insufficient recording capacity of a video tape loaded in the video tape recorder requires manually replacing the tape with a new one for recording more TV programs, an insufficient storage capacity of the hard disc of the HDD 20 in the home network system can be addressed by the user remotely operating any one of the personal computers $4_1$ through $4_N$ to erase unnecessary preset data or TV programs from the hard disc in order to make room for desired TV programs to be recorded thereto. In this manner, it is easy to allocate recording areas on the hard disc of the HDD 20 in the server apparatus 2.

A TV program transmission request by any one of the personal computers $4_1$ through $4_N$ in the home network system 1 prompts the server apparatus 2 to send the requested TV program from its storage back to the requesting PC. Conversely, any TV program held in any one of the personal computers $4_1$ through $4_N$ may also be transmitted over the LAN 3 to the server apparatus 2 for storage therein.

In the conventional video tape recording/reproducing environment, TV programs recorded on one video tape are transcribed to other video tapes for distribution purposes by use of at least two video tape recorders. This is a tedious and time-consuming process. By contrast, the home network system 1 permits easy and fast transfer of recorded TV programs from the server apparatus to the personal computers $4_1$ through $4_N$ and vice versa.

In the inventive setup described above, the server apparatus 2 is connected to the personal computers $4_1$ through $4_N$ over the LAN 3. The server apparatus 2 records and reproduces TV programs in response to operation requests from the personal computers $4_1$ through $4_N$ which are set up where desired and operated easily to control the server remotely. These components with their convenient features constitute a home network system of enhanced usability.

In the above setup, the server apparatus 2 was shown addressing analog TV broadcast when recording TV programs. However, this is not limitative of the invention. The server apparatus 3 may alternatively receive digital TV broadcast when recording TV programs or may accept analog video signals as well as digital video data from other recording/reproducing apparatuses for recording and reproducing purposes.

In the inventive setup, the personal computers $4_1$ through $4_N$ were shown retaining video capsules based on recorded TV programs and transmitting the capsules as needed to the server apparatus 2. Alternatively, the personal computers $4_1$ through $4_N$ may retain video data acquired from video cameras and may send the data to the server apparatus 2 when necessary.

In the above setup, each of the personal computers $4_1$ through $4_N$ was shown additionally displaying still pictures of a TV program being reproduced on the display unit 19. Preferably, the server apparatus 2 may also be arranged additionally to display still pictures of the TV program being played back on the display unit 19.

In the setup above, the invention was shown applied to the home network system 1 discussed with reference to FIGS. 1 through 22. However, this is not limitative of the invention. The invention may be applied extensively to diverse recording/reproducing network systems such as those in office buildings as long as each system is built on a local area network connecting a server with its terminals.

In the inventive setup above, the CPU 10 was shown carrying out a series of steps in response to operation requests from the personal computers $4_1$ through $4_N$ in keeping with the WWW browser P1, unattended recording presetting program P2, preset monitoring program P3, managing/searching program P4, editing program P5, and recording/reproducing program P6. Alternatively, such series of steps may be executed by the server apparatus 2 loaded with a program storage medium containing the WWW browser P1, unattended recording presetting program P2, preset monitoring program P3, managing/searching program P4, editing program P5, and recording/reproducing program P6.

The WWW browser P1, unattended recording presetting program P2, preset monitoring program P3, managing/searching program P4, editing program P5, and recording/reproducing program P6 designed to perform the above-described series of steps may be retained on such package media as floppy disks, CD-ROMs (Compact Disc-Read Only Memories) and DVDs (Digital Video Discs); on semiconductor memories, magnetic disks and the like where the programs are stored temporarily or permanently; on wired or wireless communication media such as local area networks, the Internet, digital satellite broadcasting networks; or in diverse communication interfaces such as routers and modems for transmitting or receiving the program offered by the foregoing media. Such media, networks, interfaces and other measures allow the necessary programs to be installed into the server apparatus 2 for program execution.

Similar program storage media may be adopted to retain the WWW browser P1, preset information setting program P7, recording/reproducing program P8 and server operation program P9 for use by the CPU 35 in each of the personal computers $4_1$ through $4_N$ carrying out the necessary steps.

In the setup discussed above, the personal computers $4_1$ through $4_N$ were depicted as terminals connected to the server apparatus over the LAN. Alternatively, various kinds of terminal equipment such as data processing terminals and portable remote terminals may be used as terminals that are linked remotely to the server apparatus over the LAN.

In the inventive setup, the server apparatus connected to its terminals over the LAN was shown composed of a personal computer. Alternatively, any other server apparatus of diverse structures may be adopted as long as it is capable of recording and reproducing video data and transmitting the data over the LAN to its terminals.

In the setup above, the server apparatus and its terminals were shown connected over a wired LAN. Alternatively, the server apparatus and its terminals may be connected on a wireless LAN.

The CPU 35 of each personal computer was described as means for generating reproduction requests bound for the server apparatus in the above setup. Alternatively, other suitable means of diverse structures may be adopted as long as they are capable of generating such reproduction requests.

In the setup above, the network interfaces 37 was depicted as means in each personal computer for communicating with the server apparatus over the LAN. Alternatively, other suitable means of diverse structures may be used by the PC to communicate with the server apparatus over the LAN.

The network interface 31 of the server apparatus in the above setup was described as means for communicating with terminals over the LAN. Alternatively, other suitable means of diverse structures may be used by the server apparatus to communicate with each terminal over the LAN.

In the inventive setup, the HDD 20 in the server apparatus was depicted as means for recording and reproducing video data to and from the hard disc serving as a predetermined storage medium. Alternatively, other suitable means involving the use of diverse storage media may be used to record and reproduce video data to and from such media.

In the setup above, the CPU 10 of the server apparatus was described as controlling means which causes the recording/reproducing means to reproduce video data from the storage medium in response to reproduction requests coming from terminals over the LAN, the controlling means further sending the reproduced video data through the communicating means to the requesting terminals over the LAN. Alternatively, other suitable controlling means of diverse structures may be adopted as long as such means are capable of causing the recording/reproducing means to reproduce video data from the storage medium in response to reproduction requests coming from terminals over the LAN, and of transmitting the reproduced video data through the communicating means to the requesting terminals over the LAN.

In the inventive setup, the CPU 10 of the server apparatus was depicted as means for generating supplementary information/data for selecting video data. Alternatively, other suitable means of diverse structures may be adopted to generate supplementary information/data by which to select video data.

In the above setup, the CPU 35 and display unit 19 of each personal computer were described as means for displaying in real time the images derived from the video data sent from the server apparatus over the LAN. Alternatively, other suitable means of diverse structures may be adopted as long as they are capable of displaying in real time the images based on the video data transmitted from the server apparatus over the LAN.

In the setup described above, the HDD 36 of each personal computer was depicted as means for recording and reproducing video data to and from the hard disc serving as a predetermined storage medium in the HDD, the video data being sent from the server apparatus over the LAN. Alternatively, other suitable means of diverse structures may be adopted to record and reproduce video data to and from an appropriate storage medium, the video data being transmitted from the server apparatus over the LAN.

In the inventive setup above, the CPU 35 of each personal computer was described as controlling means which causes the recording/reproducing means to reproduce video data from the storage medium and which transmits the reproduced image through the communicating means to the server apparatus over the LAN. Alternatively, other suitable controlling means of diverse structures may be adopted as long as such means are capable of causing the recording/reproducing means to reproduce video data from the storage medium and of transmitting the reproduced video data through the communicating means to the server apparatus over the LAN.

In the above setup, the tuner 25 of the image processing board was depicted as means for receiving video data of TV programs. Alternatively, other suitable receiving means of diverse structures may be adopted as long as such means are capable of receiving the video data representative of TV programs.

In the setup above, the CPU 10 of the server apparatus was described as means for generating unattended recording preset data for presetting TV programs for unattended recording. Alternatively, other suitable means of diverse structures may be adopted to generate the unattended recording preset data for presetting the corresponding TV programs for unattended recording.

In the inventive setup, the CPU 35 of each personal computer was depicted as means for generating preset information/data representative of designated settings for unattended recording. Alternatively, other suitable means of diverse structures may be adopted to generate such preset information/data constituting the preset details for unattended recording.

As described, a recording and reproducing system according to the invention is made up of a server apparatus and its terminals connected over a local area network that is administered independently in a limited area. In that system, any one of the terminals may generate a reproduction request and send it to the server apparatus over the LAN. In response to the request, the server apparatus reproduces video data from the storage medium installed therein and sends the reproduced video data to the requesting terminal over the LAN. In this manner, the user may reproduce video data and enjoy images thereof by remotely operating the server apparatus with ease from any terminal configured in the system. The server apparatus offers an enhanced degree of usability because there is no need to manipulate the server directly.

As many apparently different embodiments of this invention may be made without departing from the spirit and scope thereof, it is to be understood that the invention is not limited to the specific embodiments thereof except as defined in the appended claims.

What is claimed is:

1. A recording and reproducing system constituted by a server apparatus and terminal apparatuses connected over a local area network;
    wherein each of said terminal apparatuses comprises:
    operation request generating means for generating a reproduction request bound for said server apparatus; and
    terminal-side communicating means for communicating with said server apparatus over said local area network; and
    wherein said server apparatus comprises:
    server-side communicating means for communicating with each of said terminal apparatuses over said local area network;
    server-side recording/reproducing means for recording and reproducing video data to and from a predetermined server-side storage medium; and
    server-side controlling means which, in response to said reproduction request sent from any one of said terminal apparatuses over said local area network, causes said server-side recording/reproducing means to reproduce said video data from said server-side storage medium and transmits the reproduced video data through said server-side communicating means to the requesting terminal apparatus over said local area network,
    server side display control means for controlling the displaying of available reproduction requests and making the displayed available reproduction requests selectable by a user,
    wherein the available reproduction requests are a subset of a plurality of reproductions requests,
    wherein a selection of the available reproduction requests that are displayed are a function of previously transmitted data, previously reproduced data, information in response to reproduction of the previously transmitted data, and time information associated therewith.

2. A recording and reproducing system according to claim 1, wherein each of said terminal apparatuses comprises displaying means for displaying in real time images based on said video data transmitted from said server apparatus over said local area network.

3. A recording and reproducing system according to claim 2, wherein said server apparatus comprises supplementary information/data generating means for generating supplementary information/data every time said server-side recording/reproducing means reproduces said video data from said server-side storage medium in response to said reproduction request from any one of said terminal apparatuses, said supplementary information/data including a reproduction history indicative of a reproduction end position of said video data upon each session of the reproduction thereof;
    wherein said operation request generating means of each of said terminal apparatuses identifies said video data based on said supplementary information/data and generates said reproduction request for designating the reproduction start position of said video data either as the start or said reproduction end position thereof based on said reproduction history; and
    wherein said displaying means of each of said terminal apparatuses displays in real time both the images based on said video data transmitted from said server apparatus over said local area network, and still pictures based on still picture data included in said supplementary information/data transmitted along with said video data from said server apparatus.

4. A recording and reproducing system according to claim 1, wherein each of said terminal apparatuses comprises terminal-side recording/reproducing means for recording and reproducing said video data to and from a predetermined terminal-side storage medium, said video data being transmitted from said server apparatus over said local area network.

5. A recording and reproducing system according to claim 4, wherein each of said terminal apparatuses comprises terminal-side controlling means for causing said terminal-side recording/reproducing means to reproduce said video data from said terminal-side storage medium and for transmitting the reproduced video data through said terminal-side communicating means to said server apparatus over said local area network; and
    wherein said operation request generating means of each of said terminal apparatuses generates a video data recording request for prompting said server apparatus to record said video data transmitted to said server apparatus.

6. A recording and reproducing system according to claim 1, wherein said server apparatus comprises:
    receiving means for receiving said video data representative of TV programs; and
    unattended recording preset data generating means for generating data for presetting said TV programs for unattended recording;
    wherein each of said terminal apparatuses comprises preset information/data generating means for generating preset information/data representative of settings for said unattended recording; and
    wherein said unattended recording preset data generating means of said server apparatus generates unattended recording preset data based on said preset information/data transmitted from each of said terminal apparatuses over said local area network.

7. A server apparatus connected to terminal apparatuses on a local area network that is administered independently in a limited area, said server apparatus comprising:
    communicating means for communicating with each of said terminal apparatuses over said local area network;
    recording/reproducing means for recording and reproducing video data to and from a predetermined storage medium; and
    controlling means which, in response to a reproduction request sent from any one of said terminal apparatuses over said local area network, causes said recording/reproducing means to reproduce said video data from said storage medium and transmits the reproduced video data through said communicating means to the requesting terminal apparatus over said local area network,
    display control means for controlling the displaying of available reproduction requests and making the displayed available reproduction requests selectable by a user,
    wherein the available reproduction requests are a subset of a plurality of reproductions requests,
    wherein a selection of the available reproduction requests that are displayed are a function of previously transmitted data, previously reproduced data, information in response to reproduction of the previously transmitted data, and time information associated therewith.

8. A server apparatus according to claim 7, further comprising supplementary information/data generating means for generating supplementary information/data for use in selecting said video data;
    wherein, in response to a transmission request sent from any one of said terminal apparatuses over said local area network, said controlling means transmits said supplementary information/data through said communicating means to the requesting terminal apparatus over said local area network.

9. A server apparatus according to claim 8, wherein said supplementary information/data generating means generates said supplementary information/data every time said recording/reproducing means reproduces said video data from said storage medium in response to said reproduction request from any one of said terminal apparatuses, said supplementary information/data including a reproduction history indicative of a reproduction end position of said video data upon each session of the reproduction thereof; and
    wherein, in response to said reproduction request sent from any one of said terminal apparatuses over said local area network, said controlling means causes said recording/reproducing means to reproduce said video data from said storage medium and transmits the reproduced video data through said communicating means to the requesting terminal apparatus over said local area network, said reproduction request designating the reproduction start position of said video data either as the start or said reproduction end position thereof based on said reproduction history as part of said supplementary information/data.

10. A server apparatus according to claim 9, wherein said supplementary information/data generating means generates said supplementary information/data including still picture data as part of said video data; and
    wherein, in response to said reproduction request, said controlling means transmits said video data and said supplementary information/data to the requesting terminal apparatus over said local area network.

11. A server apparatus according to claim 10, wherein, in response to a recording request sent from any one of said terminal apparatuses over said local area network, said controlling means causes said recording/reproducing means to record said video data to said storage medium, said video data being transmitted from the requesting terminal apparatus over said local area network.

12. A server apparatus according to claim 7, further comprising:
    receiving means for receiving said video data representative of TV programs; and
    unattended recording preset data generating means for generating data for presetting said TV programs for unattended recording based on preset information/data transmitted from any one of said terminal apparatuses over said local area network.

13. A server apparatus according to claim 12, wherein, in response a transmission request sent from any one of said terminal apparatuses over said local area network, said controlling means transmits unattended recording preset data through said communicating means to the requesting terminal apparatus over said local area network.

14. A server apparatus according to claim 13, wherein, in response to an erase request sent from any one of said terminal apparatuses over said local area network in order to identify the unattended recording preset data to be erased, said controlling means erases said unattended recording preset data designated by said erase request.

15. A server apparatus according to claim 7, further comprising supplementary information/data generating means for generating supplementary information/data for use in selecting said video data;
    wherein, in response to an erase request sent from any one of said terminal apparatuses over said local area network in order to identify the video data to be erased, said controlling means transmits said supplementary information/data through said communicating means to the requesting terminal apparatus thereby allowing said requesting terminal apparatus to erase said video data identified by said erase request.

16. A terminal apparatus connected to a server apparatus over a local area network, comprising:
    operation request generating means for generating a reproduction request for soliciting the reproduction of recorded video data by said server apparatus capable of recording and reproducing video data; and
    communicating means for communicating with said server apparatus over said local area network;
    wherein said communicating means transmits said reproduction request generated by said operation request generating means to said server apparatus over said local area network, and receives the video data reproduced by said server apparatus in response to said reproduction request and transmitted from said server apparatus,
    displaying means for displaying available reproduction requests,
    wherein the available reproduction requests are selectable by a user,
    wherein the available reproduction requests are a subset of a plurality of reproductions requests,
    wherein a selection of the available reproduction requests that are displayed are a function of previously transmitted data, previously reproduced data, information in response to reproduction of the previously transmitted data, and time information associated therewith.

17. A terminal apparatus according to claim 16, wherein said operation request generating means generates said reproduction request for identifying the video data to be reproduced based on supplementary information/data for use in selecting said video data, said reproduction request being transmitted from said server apparatus over said local area network.

18. A terminal apparatus according to claim 17, further comprising displaying means for displaying in real time images based on said video data transmitted from said server apparatus over said local area network.

19. A terminal apparatus according to claim 18, wherein said operation request generating means generates said reproduction request for identifying said video data based on said supplementary information/data coming from said server apparatus over said local area network, said supplementary information/data including a reproduction history indicative of a reproduction end position of said video data upon each session of the reproduction thereof, said reproduction request further designating the reproduction start position of said video data either as the start or said reproduction end position thereof based on said reproduction history.

20. A terminal apparatus according to claim 19, wherein said communicating means receives said video data and said supplementary information/data including still picture data as part of said video data, said video data and said supplementary information/data being transmitted from said server apparatus over said local area network; and wherein said displaying means displays in real time both said images based on said video data transmitted from said server apparatus over said local area network, and still pictures based on said still picture data included in said supplementary information/data transmitted along with said video data from said server apparatus.

21. A terminal apparatus according to claim 17, further comprising recording/reproducing means for recording and reproducing said video data to and from a predetermined storage medium, said video data being transmitted from said server apparatus over said local area network.

22. A terminal apparatus according to claim 21, further comprising controlling means for causing said recording/reproducing means to reproduce said video data from said storage medium and for transmitting the reproduced video data through said communicating means to said server apparatus over said local area network; and
wherein said operation request generating means generates a video data recording request for prompting said server apparatus to record said video data transmitted to said server apparatus.

23. A terminal apparatus according to claim 22, wherein said recording/reproducing means records and reproduces said video data and said supplementary information/data to and from said storage medium, said video data and said supplementary information/data being transmitted from said server apparatus over said local area network, said supplementary information/data including still picture data as part of said video data.

24. A terminal apparatus according to claim 16, further comprising preset information/data generating means for generating preset information/data representative of settings for unattended recording of TV programs constituted by said video data received by said server apparatus;
wherein said communicating means transmits said preset information/data to said server apparatus over said local area network causing said server apparatus to preset said TV programs for unattended recording.

25. A terminal apparatus according to claim 24, wherein said operation request generating means generates a transmission request for prompting said server apparatus to transmit unattended recording preset data over said local area network; and
wherein said communicating means transmits said transmission request to said server apparatus over said local area network and receives said unattended recording preset data sent from said server apparatus in response to said transmission request.

26. A terminal apparatus according to claim 25, wherein said operation request generating means generates an erase request for identifying the unattended recording preset data to be erased based on said unattended recording preset data received.

27. A terminal apparatus according to claim 16, wherein said operation request generating means generates said reproduction request for identifying the video data to be erased based on supplementary information/data transmitted from said server apparatus over said local area network, said supplementary information/data being used in selecting said video data.

28. A recording and reproducing method for use with a server apparatus connected to terminal apparatuses on a local area network that is administered independently in a limited area, the method comprising the steps of:
receiving a reproduction request sent from any one of said terminal apparatuses over said local area network; and
reproducing the video data from a predetermined storage medium in response to said reproduction request before transmitting the reproduced video data to the requesting terminal apparatus over said local area network,
controlling the displaying of available reproduction requests and making the displayed available reproduction requests selectable by a user,
wherein the available reproduction requests are a subset of a plurality of reproductions requests,
wherein a selection of the available reproduction requests that are displayed are a function of previously transmitted data, previously reproduced data, information in response to reproduction of the previously transmitted data, and time information associated therewith.

29. A recording and reproducing method according to claim 28, further comprising the steps of:
generating supplementary information/data for use in selecting said video data;
receiving a transmission request sent from any one of said terminal apparatuses over said local area network; and
transmitting said supplementary information/data to the requesting terminal apparatus over said local area network in response to said transmission request in order to identify said video data to be reproduced.

30. A recording and reproducing method according to claim 28, further comprising the steps of:
receiving a recording request and the video data to be recorded upon transmission thereof from any one of said terminal apparatuses over said local area network; and
recording said video data to said storage medium in response to said recording request.

31. A recording and reproducing method according to claim 28, further comprising the steps of:
receiving said video data representative of TV programs;
generating unattended recording preset data for presetting said TV programs made of said video data for unattended recording based on preset information/data transmitted from any one of said terminal apparatuses over said local area network; and
recording said video data of said TV programs to said storage medium in accordance with said unattended recording preset data, thereby recording said TV programs.

32. A recording and reproducing method according to claim 31, further comprising the steps of:
receiving a transmission request sent from any one of said terminal apparatuses over said local area network; and
transmitting said unattended recording preset data to the requesting terminal apparatus over said local area network in response to said transmission request.

33. A recording and reproducing method according to claim 32, further comprising the steps of:
receiving an erase request sent from any one of said terminal apparatuses over said local area network, said erase request soliciting erasure of the unattended recording preset data designated by said erase request; and
erasing said unattended recording preset data designated by said erase request.

34. A recording and reproducing method according to claim 28, further comprising the steps of:
receiving an erase request sent from any one of said terminal apparatuses over said local area network, said erase request soliciting erasure of the video data designated by said erase request; and
erasing said video data designated by said erase request.

35. An operating method for use with a terminal apparatus connected to a server apparatus over a local area network, the method comprising the steps of:
   generating a reproduction request for soliciting the reproduction of recorded video data by said server apparatus capable of recording and reproducing video data; and
   receiving the video data reproduced and transmitted by said server apparatus in response to said reproduction request transmitted to said server apparatus over said local area network,
   displaying available reproduction requests,
   wherein the displayed available reproduction requests are selectable by a user,
   wherein the available reproduction requests are a subset of a plurality of reproductions requests,
   wherein a selection of the available reproduction requests that are displayed are a function of previously transmitted data, previously reproduced data, information in response to reproduction of the previously transmitted data, and time information associated therewith.

36. An operating method according to claim 35, wherein said request generating step comprises generating said reproduction request for identifying said video data to be reproduced based on supplementary information/data transmitted from said server apparatus over said local area network, said supplementary information/data being used in selecting said video data.

37. An operating method according to claim 36, further comprising the step of displaying in real time images based on said video data transmitted from said server apparatus over said local area network.

38. An operating method according to claim 36, further comprising the step of recording and reproducing said video data to and from a predetermined storage medium, said video data being transmitted from said server apparatus over said local area network.

39. An operating method according to claim 36, further comprising the step of reproducing said video data from said storage medium before transmitting the reproduced video data through communicating means to said server apparatus over said local area network;
   wherein said request generating step comprises generating a video data recording request for prompting said server apparatus to record said video data transmitted to said server apparatus.

40. An operating method according to claim 35, further comprising the steps of:
   generating preset information/data representative of settings for unattended recording of TV programs constituted by said video data received by said server apparatus; and
   transmitting said preset information/data to said server apparatus over said local area network causing said server apparatus to preset said TV programs for unattended recording.

41. An operating method according to claim 40, wherein said request generating step comprises transmitting a transmission request to said server apparatus over said local area network, said transmission request having been generated to prompt said server apparatus to transmit unattended recording preset data over said local area network;
   said operating method further comprising the step of receiving said unattended recording preset data transmitted from said server apparatus in response to said transmission request.

42. An operating method according to claim 41, wherein said request generating step comprises generating an erase request for identifying the unattended recording preset data to be erased based on said unattended recording preset data received.

43. An operating method according to claim 35, wherein said request generating step comprises generating said reproduction request for identifying the video data to be erased based on supplementary information/data transmitted from said server apparatus over said local area network, said supplementary information/data being used in selecting said video data.

44. A program storage medium which stores a program for use with a server apparatus connected to terminal apparatuses on a local area network that is administered independently in a limited area, said program causing said server apparatus to execute the steps of:
   receiving a reproduction request sent from any one of said terminal apparatuses over said local area network; and
   reproducing video data from a predetermined storage medium in response to said reproduction request before transmitting the video data to the requesting terminal apparatus over said local area network,
   controlling the displaying of available reproduction reciuests and making the displayed available reproduction requests selectable by a user,
   wherein the available reproduction requests are a subset of a plurality of reproductions requests,
   wherein a selection of the available reproduction reciuests that are displayed are a function of previously transmitted data, previously reproduced data, information in response to reproduction of the previously transmitted data, and time information associated therewith.

45. A program storage medium according to claim 44, wherein said program further comprises the steps of:
   generating supplementary information/data for use in selecting said video data;
   receiving a transmission request from any one of said terminal apparatuses over said local area network; and
   transmitting said supplementary information/data to the requesting terminal apparatus over said local area network in response to said transmission request in order to identify said video data to be reproduced.

46. A program storage medium according to claim 44, wherein said program further comprises the steps of:
   receiving a recording request and the video data to be recorded upon transmission thereof from any one of said terminal apparatuses over said local area network; and
   recording said video data to said storage medium in response to said recording request.

47. A program storage medium according to claim 44, wherein said program further comprises the steps of:
   receiving said video data representative of TV programs;
   generating unattended recording preset data for presetting said TV programs made of said video data for unattended recording based on preset information/data transmitted from any one of said terminal apparatuses over said local area network; and
   recording said video data of said TV programs to said storage medium in accordance with said unattended recording preset data, thereby recording said TV programs.

48. A program storage medium according to claim 47, wherein said program further comprises the steps of:
   receiving a transmission request from any one of said terminal apparatuses over said local area network; and transmitting said unattended recording preset data to the requesting terminal apparatus over said local area network in response to said transmission request.

49. A program storage medium according to claim 48, wherein said program further comprises the steps of:
receiving an erase request sent from any one of said terminal apparatuses over said local area network, said erase request soliciting erasure of the unattended recording preset data designated by said erase request; and
erasing said unattended recording preset data designated by said erase request.

50. A program storage medium according to claim 44, wherein said program further comprises the steps of:
receiving an erase request sent from any one of said terminal apparatuses over said local area network, said erase request soliciting erasure of the video data designated by said erase request; and
erasing said video data designated by said erase request.

51. A program storage medium which stores a program for use with a terminal apparatus connected to a server apparatus over a local area network, said program causing said terminal apparatus to execute the steps of:
generating a reproduction request for soliciting the reproduction of recorded video data by said server apparatus capable of recording and reproducing video data; and
receiving the video data reproduced and transmitted by said server apparatus in response to said reproduction request transmitted to said server apparatus over said local area network,
displaying of available reproduction requests,
wherein the displayed available reproduction requests are selectable by a user,
wherein the available reproduction requests are a subset of a plurality of reproductions requests,
wherein a selection of the available reproduction requests that are displayed are a function of previously transmitted data, previously reproduced data, information in response to reproduction of the previously transmitted data, and time information associated therewith.

52. A program storage medium according to claim 51, wherein said request generating step comprises generating said reproduction request for identifying said video data to be reproduced based on supplementary information/data transmitted from said server apparatus over said local area network, said supplementary information/data being used in selecting said video data.

53. A program storage medium according to claim 52, wherein said program further comprises the step of displaying in real time images based on said video data transmitted from said server apparatus over said local area network.

54. A program storage medium according to claim 52, wherein said program further comprises the step of recording and reproducing said video data to and from a predetermined storage medium, said video data being transmitted from said server apparatus over said local area network.

55. A program storage medium according to claim 54, wherein said program further comprises the step of reproducing said video data from said storage medium before transmitting the reproduced video data through communicating means to said server apparatus over said local area network; and
wherein said request generating step comprises generating a video data recording request for prompting said server apparatus to record said video data transmitted to said server apparatus.

56. A program storage medium according to claim 51, wherein said program further comprises the steps of:
generating preset information/data representative of settings for unattended recording of TV programs constituted by said video data received by said server apparatus; and
transmitting said preset information/data to said server apparatus over said local area network causing said server apparatus to preset said TV programs for unattended recording.

57. A program storage medium according to claim 56, wherein said request generating step comprises transmitting a transmission request to said server apparatus over said local area network, said transmission request having been generated to prompt said server apparatus to transmit unattended recording preset data over said local area network;
said program further comprising the step of receiving said unattended recording preset data transmitted from said server apparatus in response to said transmission request.

58. A program storage medium according to claim 57, wherein said request generating step comprises generating an erase request for identifying the unattended recording preset data to be erased based on said unattended recording preset data received.

59. A program storage medium according to claim 51, wherein said request generating step comprises generating said reproduction request for identifying the video data to be erased based on supplementary information/data transmitted from said server apparatus over said local area network, said supplementary information/data being used in selecting said video data.

* * * * *